United States Patent
Coch et al.

(10) Patent No.: US 8,280,625 B2
(45) Date of Patent: Oct. 2, 2012

(54) METHODS AND APPARATUS FOR GEO-COLLABORATION

(75) Inventors: Gabriel Coch, Chapel Hill, NC (US); David Mark Smith, Harrogate (GB); Graham Knight, Brighton (GB)

(73) Assignee: VID Scale, Inc., Wilmington, DE (US)

( * ) Notice: Subject to any disclaimer, the term of this patent is extended or adjusted under 35 U.S.C. 154(b) by 0 days.

(21) Appl. No.: 13/293,945

(22) Filed: Nov. 10, 2011

(65) Prior Publication Data

US 2012/0150443 A1 Jun. 14, 2012

Related U.S. Application Data

(63) Continuation of application No. 13/041,528, filed on Mar. 7, 2011, now Pat. No. 8,078,398, which is a continuation of application No. 12/781,886, filed on May 18, 2010, now Pat. No. 7,904,241, which is a continuation of application No. 11/304,217, filed on Dec. 15, 2005, now Pat. No. 7,739,038.

(60) Provisional application No. 60/636,653, filed on Dec. 17, 2004.

(51) Int. Cl.
*G01C 21/30* (2006.01)
(52) U.S. Cl. ......... 701/409; 701/412; 701/418; 701/450
(58) Field of Classification Search .................. 701/408, 701/409, 412, 450, 454, 468, 484, 487, 300, 701/418; 340/989–993, 995.1–995.18; 709/211–216
See application file for complete search history.

(56) References Cited

U.S. PATENT DOCUMENTS

| | | |
|---|---|---|
| 5,948,040 A | 9/1999 | DeLorme et al. |
| 6,199,010 B1 | 3/2001 | Richton |
| 6,408,307 B1 | 6/2002 | Semple et al. |
| 6,826,598 B1 | 11/2004 | Titmuss et al. |
| 6,879,838 B2 | 4/2005 | Rankin et al. |
| 6,912,462 B2 | 6/2005 | Ogaki |
| 7,256,711 B2 | 8/2007 | Sheha et al. |

(Continued)

FOREIGN PATENT DOCUMENTS

JP 2001-317953 A 11/2001

OTHER PUBLICATIONS uLocate Communications Inc., uLocate, Jun. 2, 2003, http://www.ulocate.com/service.html.

(Continued)

*Primary Examiner* — Richard M. Camby
(74) *Attorney, Agent, or Firm* — Condo Roccia LLP

(57) ABSTRACT

Methods and computer readable medium for collaborating on geographical maps between two or more computers are disclosed. In particular, sharing a geographical location on a map between two or more computers and co-navigating a map between two or more computers are disclosed. With respect to sharing a geographical location, the geographical location is retrieved to the first computer. The geographical location is added to the map being rendered at the first computer and is sent to a second computer. A map including the geographical location is rendered at the second computer. With respect to co-navigating, a map is displayed from a map perspective at the first computer. The map perspective is sent to the second computer. A map from the same map perspective being displayed at the first computer is rendered at the second computer.

20 Claims, 28 Drawing Sheets

U.S. PATENT DOCUMENTS

| | | |
|---|---|---|
| 7,353,034 B2 | 4/2008 | Haney |
| 7,460,872 B2 | 12/2008 | Millard et al. |
| 7,532,979 B2 | 5/2009 | Fuchs |
| 7,577,520 B2 | 8/2009 | Nomura |
| 7,593,740 B2 | 9/2009 | Crowley et al. |
| 7,627,425 B2 | 12/2009 | Salmre et al. |
| 7,873,618 B2 * | 1/2011 | Nakahira ............ 707/705 |
| 2005/0288036 A1 | 12/2005 | Brewer et al. |
| 2006/0058942 A1 | 3/2006 | Lee |
| 2010/0011081 A1 | 1/2010 | Crowley et al. |

OTHER PUBLICATIONS

Keyhole Inc., Using Keyhole, 2003, Keyhole, Inc.

Technical Manual Operator and Maintenance Manual for Defense Advanced GPS Receiver (DAGR) Satellite Signals Navigation Set, TO 31R4-2PSN13-1, Jun. 1, 2005, pp. 1-626.

* cited by examiner

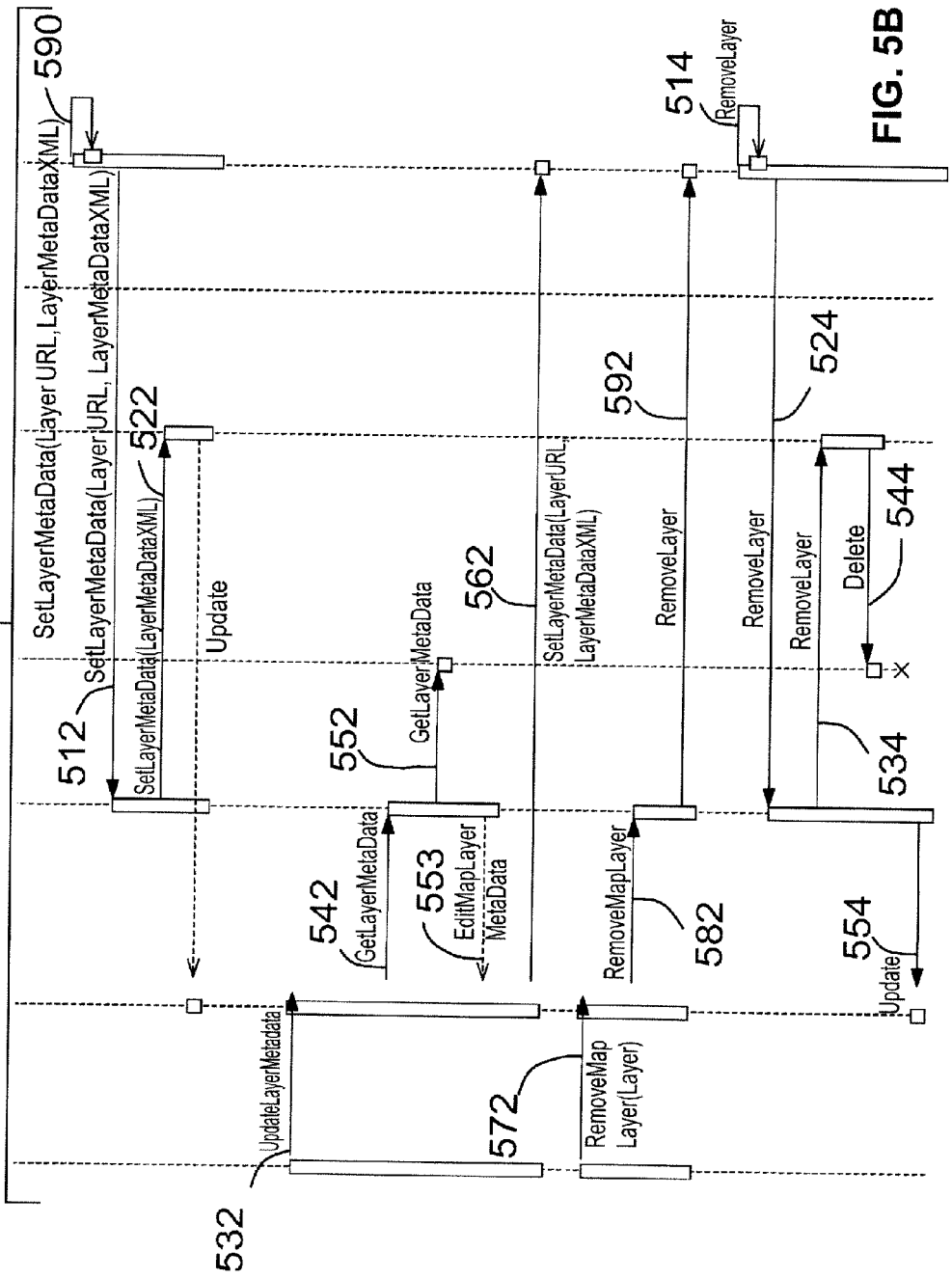

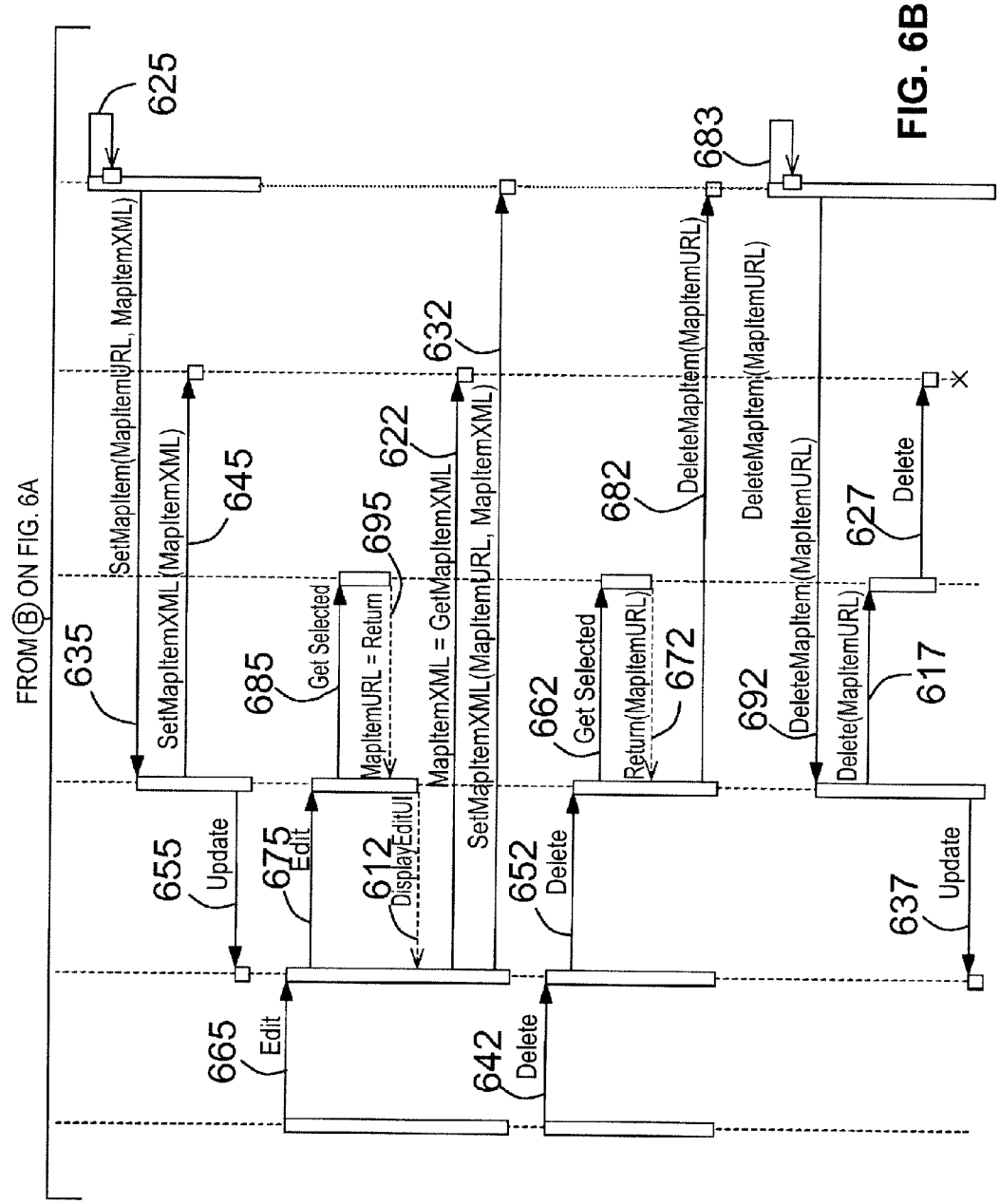

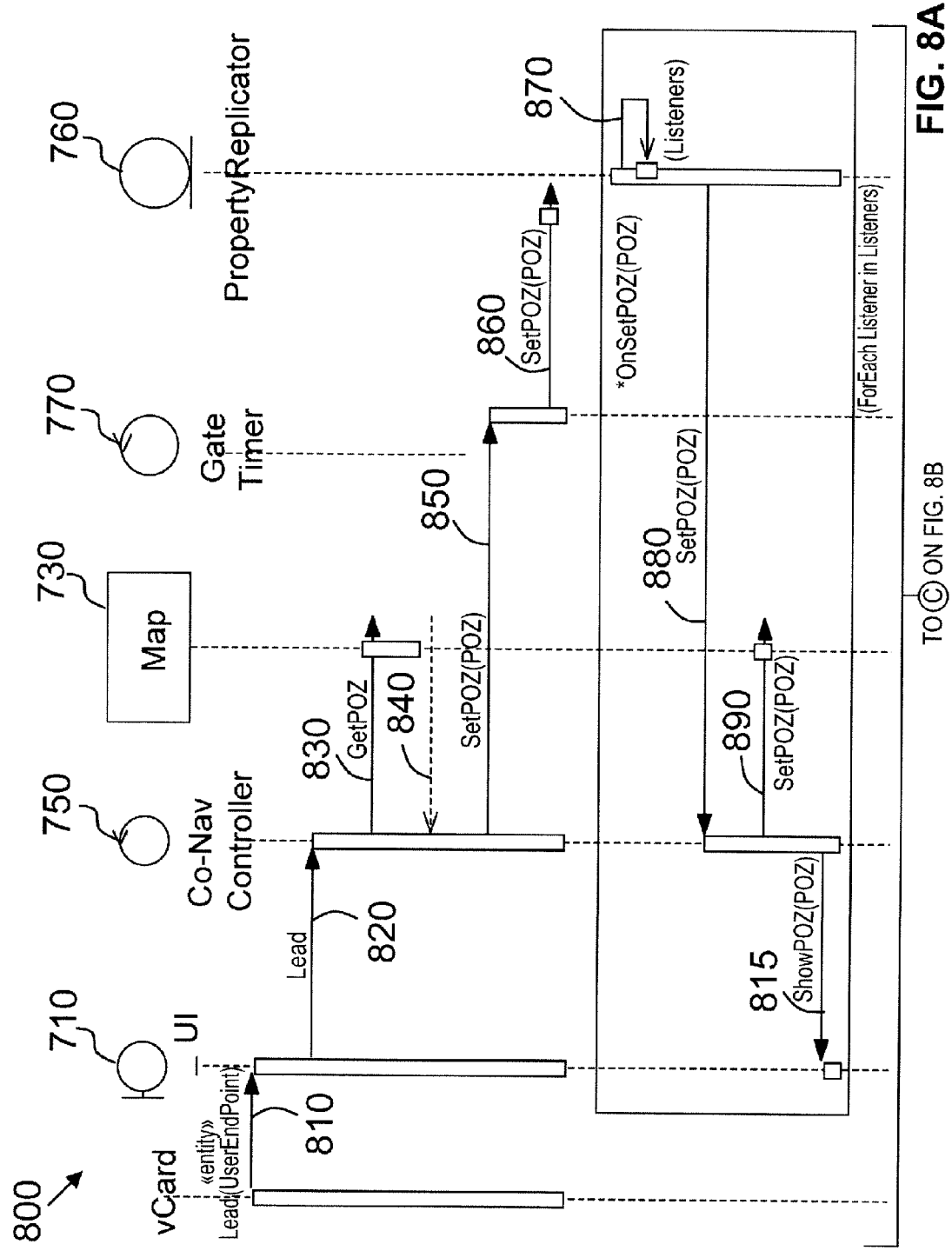

METHODS AND APPARATUS FOR GEO-COLLABORATION

This application is a continuation of U.S. Ser. No. 13/041,528 filed Mar. 7, 2011, which is a continuation of U.S. Ser. No. 12/781,886 filed May 18, 2010, which is a continuation of U.S. Ser. No. 11/304,217 filed Dec. 15, 2005 and claims the benefit of U.S. Provisional Ser. No. 60/636,953 filed on Dec. 17, 2004, all of which are incorporated by reference herein in their entirety.

FIELD OF THE INVENTION

The present invention relates generally to methods and apparatus for collaborative usage of geographical information, and more particularly, to advantageous techniques for combining geographical information systems with collaborative systems to achieve advantageous map features between users of two or more computers.

BACKGROUND OF THE INVENTION

Geographical information systems (GIS), computerized mapping systems that enable a user to visualize geographical information such as topographical, natural or man made borders, rivers, lakes, and the like have been around for many years. A computerized map file, such as Environmental Systems Research Institute's (ESRI) geodatabase file format, comprises one or more layers of geographical information which, when rendered together on a computer screen, shows a user a cognizable map. Each layer may provide different information relating to geography or contain geospatial information such as statistical, demographic, and other like information relating to the geography. For example, a world map may have five or more layers. One layer may include geographical information to render the borders of the world's continents. A second layer may include geographical information to render the borders of the world's countries. A third layer may include geographical information to render the borders of states in a country. A fourth layer may include geographical information to render the borders of counties in a state. A fifth layer may include geographical information to render the borders of cities within the counties. Other layers may include population distributions, school districts, locations of government offices, and the like.

Collaborative software is application software that integrates work on a single project by several concurrent users at separated workstations. In its modern form, it was pioneered by Lotus Software with the popular Lotus Notes application running in connection with a Lotus Domino server. Collaborative software allows participants to have collaborative interactions which allow participants to alter a collaboration entity such as a document or other common deliverable. Typically, collaborative software applications are limited to allowing users to jointly edit a document, a presentation, a spreadsheet, or other flat file. Collaborative software applications may provide a virtual repository which allows data to be replicated, stored, and synchronized on multiple computers operating in a peer-to-peer relationship. A member of a virtual repository is a user who has been assigned and given permission to share information in the virtual repository. For example, Groove® Virtual Office provides a concept called a "workspace" which allows users, who have been assigned to the same workspace, to share and synchronize files which have been added to the workspace.

Computerized maps, on the other hand, may contain voluminous and complex information. Rather than merely revealing magnified information when zooming in on documents, presentations, spreadsheets, when a user zooms in on a computerized map, additional information is revealed to the user. For example, a user viewing the map of the United States may see the borders of each state and the country's borders. However, when the user zooms into a particular city street, the viewer may render points of interest to the user such as particular stores, gas stations, parks, and the like. Additionally, a user may scroll a map, for example of the world, which has no defined beginning or end. Consequently, a map file has to contain a lot of information that may or may not be rendered depending on a user's interaction with a map.

As noted in "IT Roadmap to a GeoSpatial Future," The National Academies Press, 2003, many problems in combining GIS with collaborative software applications have been identified. This book recognizes that "there has been no attention to how the new collaborative features might be integrated with geospatial analysis activities and only limited attention to the role of interactive visualizations in facilitating cooperative work." Furthermore, this work recognizes that the volume and complexity of the geospatial information will make it increasingly hard to use effectively. This book recognizes that many research efforts have centered on the creation of virtual spaces but have not determined how to enable navigation through virtual spaces in a collaborative manner.

SUMMARY OF THE DISCLOSURE

Among its several aspects, the present invention addresses problems such as those described above and brings together the core functions of collaborative software applications with those of GIS to provide a collaborative framework based on maps and location. Another aspect of the present invention provides computer users with the ability to share, independently of their respective location, maps and geospatial information overlaid on maps. Another aspect of the present invention, called decentralized data updating in synchronous and asynchronous modes, provides users with the ability to work with geospatial information while connected or disconnected from other collaborators. Another aspect of the present invention, called asymmetrical information management, provides users with the ability to choose to share all or portions of their own geospatial information with other users.

Methods and computer readable medium for collaborating on geographical maps between two or more computers are disclosed. In particular, techniques for sharing a geographical location on a map between two or more computers and co-navigating a map between two or more computers are disclosed. As an example, with respect to sharing a geographical location, the geographical location is retrieved to the first computer. The geographical location is added to the map being rendered at the first computer and is sent to a second computer. A map including the geographical location is rendered at the second computer. As another example, with respect to co-navigating, a map is displayed from a map perspective at the first computer. The map perspective is sent to the second computer. A map from the same map perspective being displayed at the first computer is rendered at the second computer.

A more complete understanding of the present invention, as well as further features and advantages of the invention, will be apparent from the following Detailed Description and the accompanying drawings.

DETAILED DESCRIPTION

The present invention will now be described more fully with reference to the accompanying drawings, in which several presently preferred embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art.

As will be appreciated by one of skill in the art, the present invention may be embodied as methods, systems, or computer program products. Accordingly, the present invention may take the form of a hardware embodiment, a software embodiment or an embodiment combining software and hardware aspects. Furthermore, the present invention may take the form of a computer program product on a computer-usable storage medium having computer-usable program code embodied in the medium. Any suitable computer readable medium may be utilized including hard disks, CD-ROMs, optical storage devices, flash memories, or magnetic storage devices.

Figure 1:
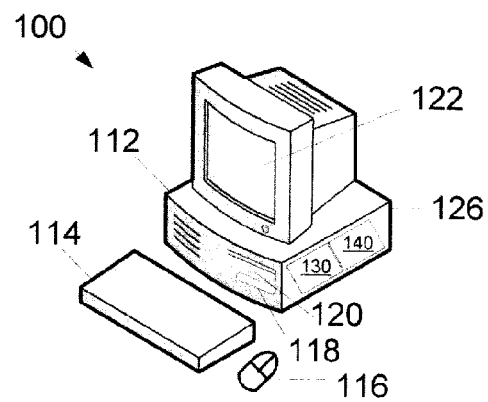
FIG. 1 shows an illustrative system employing a geo-collaboration system in a stand alone environment in accordance with the present invention.

FIG. 1 shows a diagram of a system 100 employing a geo-collaboration system in a stand-alone environment accordance with the present invention. The illustrated system 100 is implemented as a stand-alone personal computer or workstation 112. As described in further detail below, system 100 includes geo-collaboration software 130 in accordance with the present invention which is stored in memory and run by the central processing unit of the personal computer 112. The presently preferred geo-collaboration software 130 is embodied in a software product known as Toucan Navigate. System 100 also includes collaboration software 140 such as Groove® Virtual Office which is also stored in memory and run by the central processing unit of the personal computer 112. The collaboration software 140 is responsible for synchronizing data on a peer-to-peer basis between two or more computers. For example, if a document is shared between two computers, each computer has a copy of the document and the collaboration software is responsible for synchronizing the latest updates to the document to each respective copy. Although the present invention has been implemented using Groove® Virtual Office, it should be noted that the use of other collaboration software applications which can synchronize data between two or more computers is contemplated by the present invention.

The computer 112 includes a number of standard input and output devices, including a keyboard 114, mouse 116, CD-ROM drive 118, disk drive 120, and monitor 122. In addition, the computer 112 includes an Internet or network connection 126 for downloading software, data, and updates. It will be appreciated, in light of the present description of the invention, that the present invention may be practiced in any of a number of different computing environments without departing from the scope of the invention. For example, the system 100 may be implemented in a network configuration with individual workstations connected to a server. Also, other input and output devices such as laptops, handheld devices, or cell phones, for example, may be used, as desired.

One embodiment of the invention has been designed for use on a stand-alone personal computer, laptop, or workstation on an Intel Pentium or later processor, using as an operating system Windows XP, Windows NT, or the like.

In the configuration depicted in FIG. 1, the geo-collaboration software 130 in accordance with the present invention may be used to add and remove layers of a map, to add and remove geographical objects to a layer or layers, and to add and remove a location to a map. These functions are described in further detail in connection with FIGS. 4-6. A layer may be static or dynamic. A static layer contains well-known geography such as roads, county borders, all the locations of McDonalds in Texas, and the like. A dynamic layer contains map objects which are created in response to information coming from a remote data source or added by an individual user. One remote data source, for example, is the National Office of Aeronautics which provides a severe weather warning feed of information. Geographical objects may be added to a static or dynamic layer. Exemplary geographical objects include a point, a line, a 2-dimensional shape, a 3-dimensional shape, a graphic, and the like.

Figure 2:
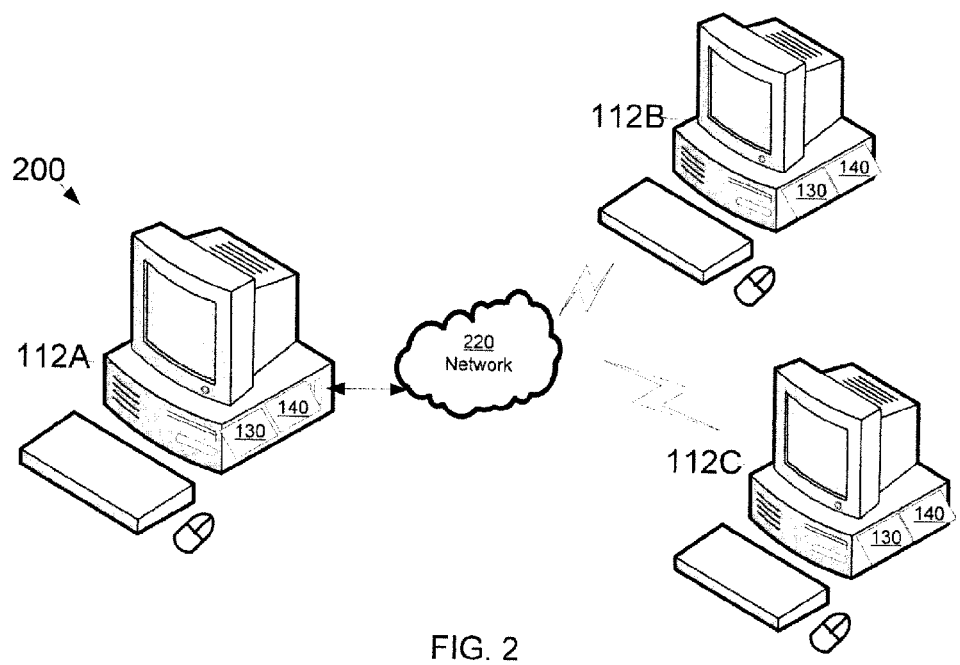
FIG. 2 shows an illustrative network environment employing geo-collaboration system in accordance with the present invention.

FIG. 2 shows an illustrative network environment 200 employing geo-collaboration system in accordance with the present invention. The network environment 200 includes three computers 112A-112C and a network 220. The network 220 may include any local area network, wide area network, Internet, some combination of network connections, or the like. The network environment 200 may suitably include wired and wireless connections. Computers 112A-112C operate in a peer-to-peer relationship. Computers 112A-112C execute geo-collaboration software 130 in accordance with the present invention and collaboration software application 140. Although FIG. 2 shows three computers 112A-112C, geo-collaboration features involving the sharing of geo-spatial information achieved by geo-collaboration software 130 according to the teachings of the present invention may include two or more computers.

If, for example, a map or a layer of a map is modified on computer 112A while in the stand alone environment as illustrated in FIG. 1, all of the modifications to the map and layer which are shared with other users are synchronized once computer 112A is connected to network 220. While computers 112A-112C are connected over a network and modifications are made to a map or a layer of a map, a modification made on computer 112A becomes viewable on computers 112B and 112C and vice versa as long as the map or layer of the map containing the modification is shared between the computers. Further exemplary details of how modifications are shared will be described in connection with FIGS. 4 and 5.

Figure 3A:
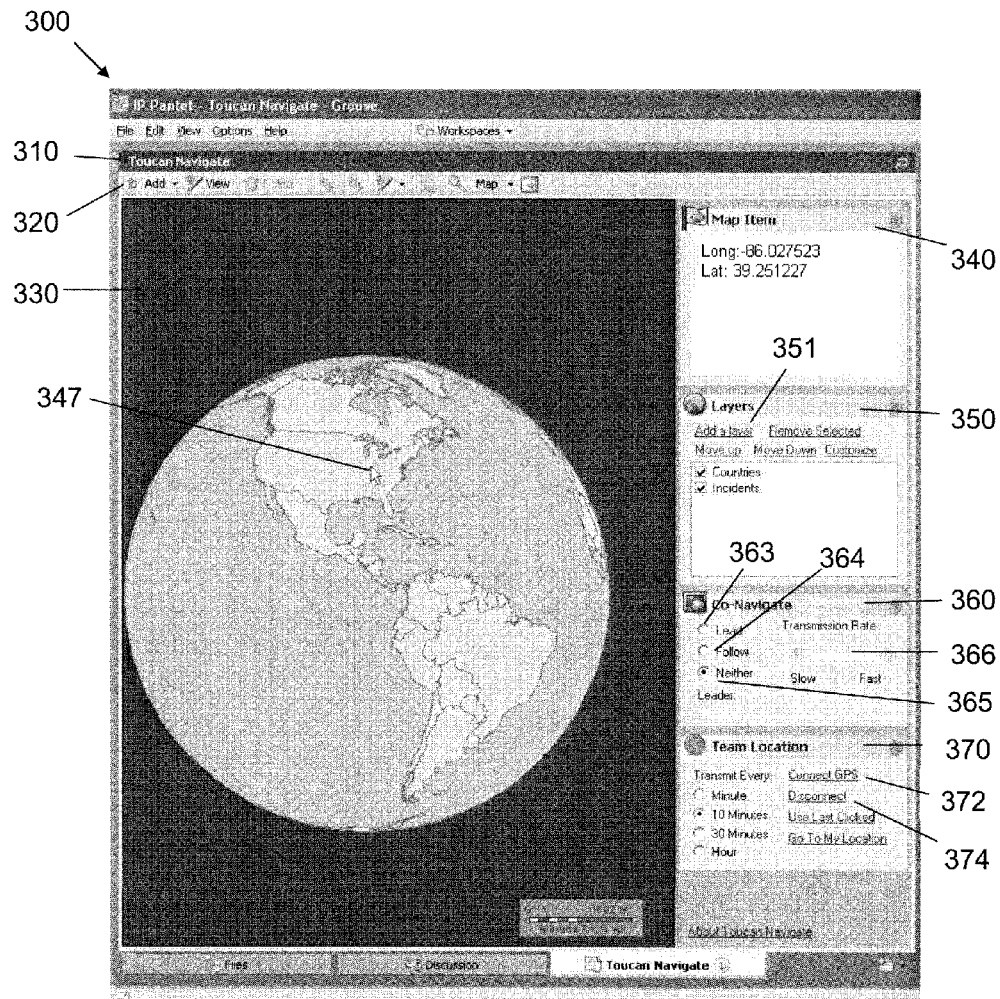
FIG. 3A shows an exemplary main screen for geo-collaboration software in accordance with the present invention.

FIG. 3A shows the main user interface screen 300 of the geo-collaboration software 130 in accordance with the present invention. The main screen 300 includes a map viewer 310. The map viewer 310 includes a map toolbar 320, a map item pane 340, a layers pane 350, a co-navigate pane 360, and a team location pane 370. Each of these panes provides access to geo-collaboration features implemented by geo-collaboration software 130. As shown in FIG. 3A, the map viewer 310 renders an exemplary map 330 of the Earth. It should be noted that the shading shown in FIGS. 3A-3L represent various colors displayed on a computer screen.

The map item pane 340 displays the current location of pointing device or cursor 347 on the rendered map 330. As shown, the map item pane 340 displays that the present cursor 347 is at rest at longitude −86.027523° and the latitude is 39.291227°. The map item pane 340 may also display attributes associated with a particular location being pointed to by a pointing device, interacting with a global positioning system (GPS) device, or the like. For example, if the pointing device points to a location which has been assigned other attributes like an address, a telephone number, names, or the like, those attributes would also be displayed in the map item pane 340.

The layers pane 350 provides a user the capability to manage layers that compose the rendered map 330. The map viewer 310 aggregates and renders all the loaded layers of a map as indicated in the layers pane 350. As illustrated in FIG. 3, the map view 310 renders layers named "countries" and "incidents" to compose the map 330. A map layer may comprise colored symbols, labels, shapes defined by one or more persons which are replicated to other related computers. To add a layer, the user clicks on link 351. A layer may be added from the file system accessible by the processor executing the geo-collaboration software application 130 or a shared virtual repository such as a workspace. The added layer is then rendered by the map viewer 310 and overlaid on map 330. If, for example, the map viewer 310 was being executed by computer 112A and that the layer was retrieved from computer 112A's file system, the added layer would only be visible on computer 112A. On the other hand, if the layer was retrieved from the shared virtual repository and the users of computers 112E and 112C were also members of the shared virtual repository, the map viewers executing on computers 112B and 112C would display the layer added by computer 112A. This feature of managing layers of a map is called decentralized geographical data update because any member may add a layer of a map to be shared or not depending on whether the layer has been added to the shared virtual repository.

Toolbar 320 provides tools including a tool for managing a layer. The "Add" drop down provides a user to add incidents such as points, lines, areas, and other objects to a layer of map 330. For example, if the user at computer 112A adds a new layer as described in further detail in connection with FIG. 5, the user can add incidents to the map layer and if the map layer is taken from or added to a shared virtual repository, those added incidents are then rendered by map viewers executing on computers 112B and 112C.

Exemplary geo-collaboration features include asymmetric geographical information management, co-navigation, team location presence and awareness, and decentralized geographical data updates. The asymmetric geographical information management, co-navigation, and team location presence and awareness features will be discussed further below in order by showing a visible representation of the features. A discussion of the internal software components of the geo-collaboration software application 130 to achieve the features will then follow.

Figure 3B:
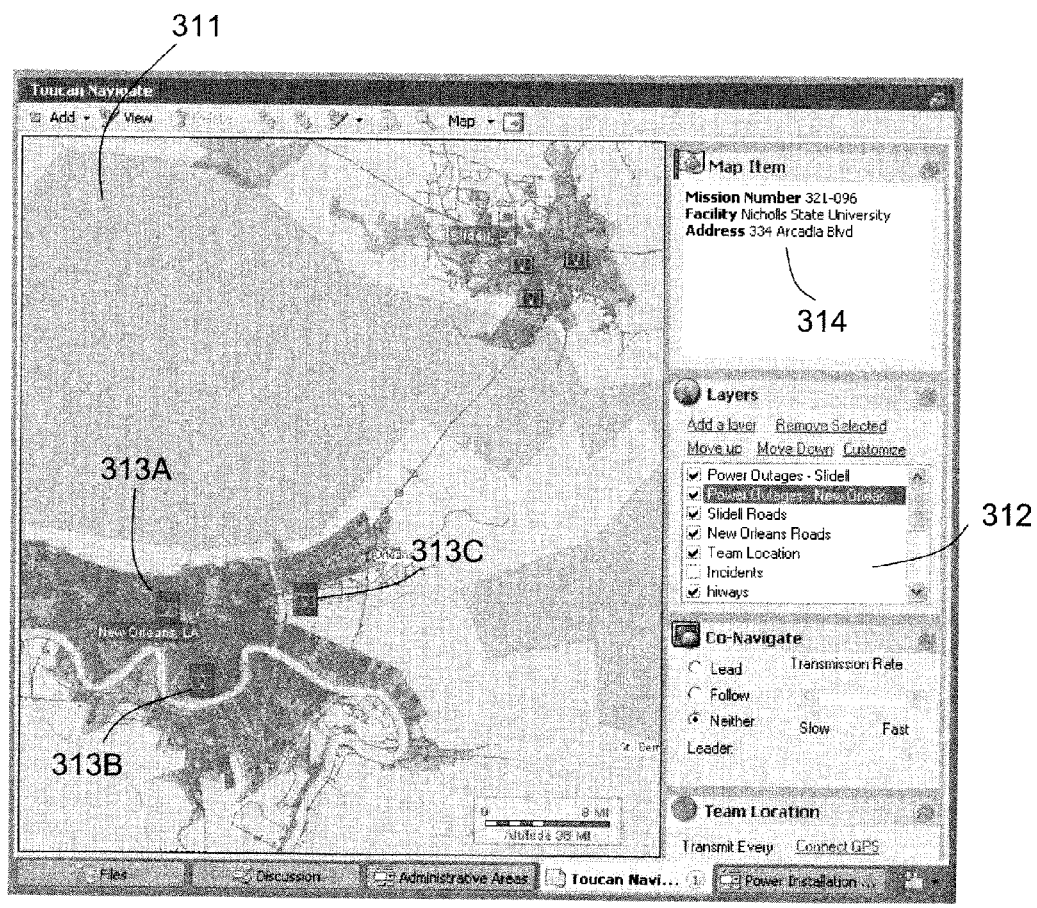
FIG. 3B shows a map of New Orleans, La. being rendered by geo-collaboration software at computer 112A in accordance with the present invention.
Figure 3C:
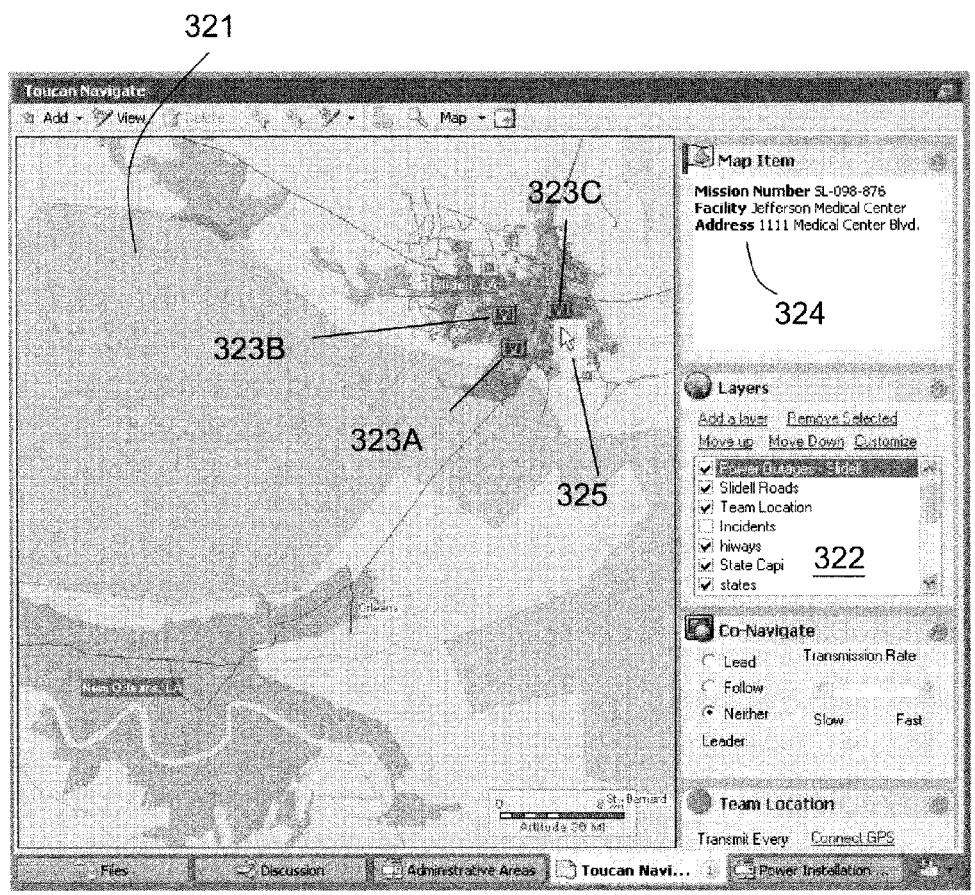
FIG. 3C shows a map of Slidell, La. being rendered by the geo-collaboration software at computer 112B in accordance with the present invention.
Figure 3D:
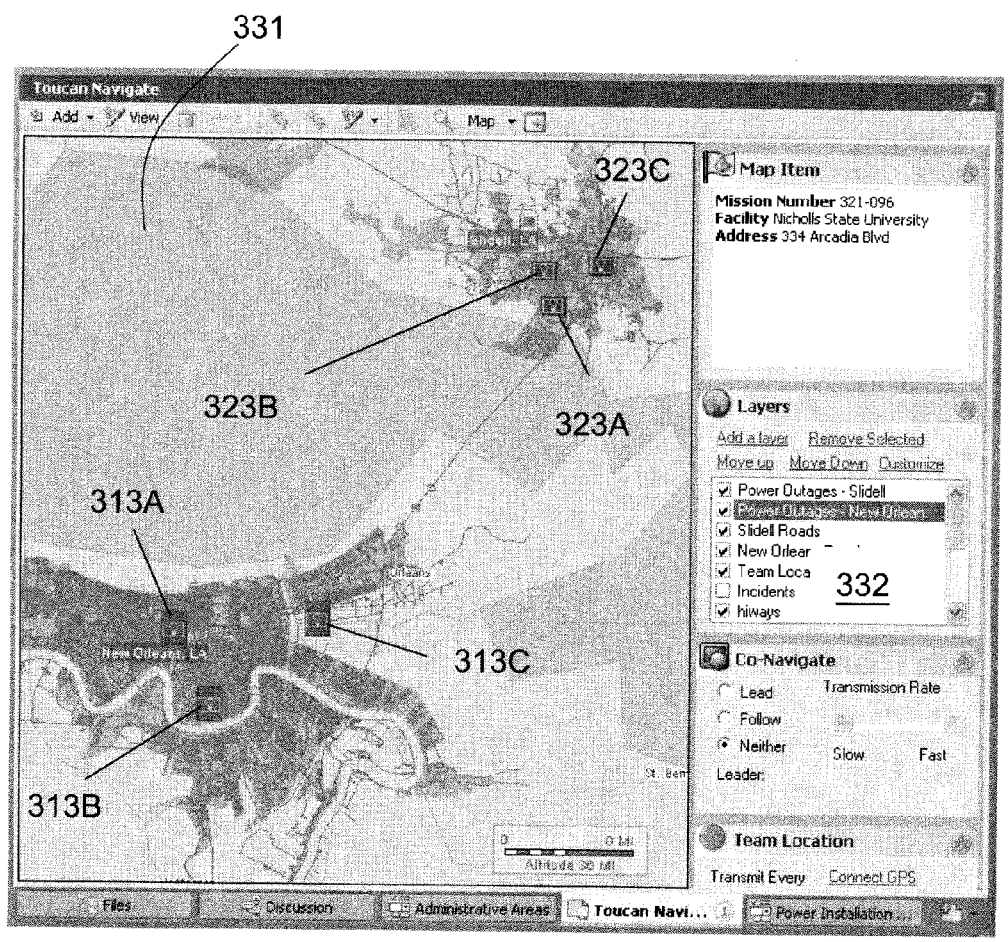
FIG. 3D shows a map of New Orleans and Slidell being rendered by the geo-collaboration software at computer 112C in accordance with the present invention.

FIGS. 3B-3D show portions of maps being shared between users at computers 112A-112C respectively to illustrate the feature entitled geo-visualization. The user of computer 112A is a member of a virtual repository called "New Orleans Power Outage." The user of computer 112B is a member of a virtual repository called "Slidell Power Outage." The user of computer 112C is a member of both virtual repositories. For example, the user of computer 112A may be a relief manager responsible for New Orleans, the user of computer 112B may be a relief manager responsible for Slidell, and the user of computer 112C may be the manager responsible for the entire state of Louisiana.

FIG. 3B shows a map 311 of New Orleans, La. being rendered by the geo-collaboration software 130 at computer 112A in accordance with the present invention. As a member of the New Orleans Power Outage virtual repository, the map viewer 310 renders a certain set of map layers. Referring to layer pane 312, these rendered layers include Power Off—New Orleans, Incidents, highways, state capitals, states, lakes, rivers, and Louisiana roads. How these layers are added to other computers, edited, and removed in order to be presented across multiple computers will be described in further detail in connection with discussion of FIG. 5. The Power Off—New Orleans layer is illustrated by the display icons 313A-313C which represents locations in New Orleans where the power is off. Map item pane 314 displays information related to the power off location map item 313C. This information is displayed when a pointing device hovers or clicks on an icon of interest. Adding, updating, and deleting map item information according to the present invention across multiple machines is discussed in further detail in connection with FIG. 6. A map item when rendered in a map may be a location, a point, a line, a shape, an icon, or the like.

FIG. 3C shows a map 321 of Slidell, La. being rendered by the geo-collaboration software 130 at computer 112B in accordance with the present invention. As a member of the Slidell Power Outage virtual repository, the map viewer 310 renders a certain set of map layers. Referring to layer pane 322, these rendered layers include Power Off—Slidell, incidents, highways, state capitals, states, lakes, rivers, and Louisiana roads. The Power Off—Slidell layer is illustrated by the display icons 323A-323C which represents locations in Slidell where the power is off. Since a pointing device 325 is over location 323C, map item 324 displays information related to the power off status at location 323C. Since the relief manager responsible for Slidell, who uses the computer 112B, is not a member of the virtual repository "Power Outages—New Orleans," the power outages in New Orleans are not shown on computer 112B. Likewise, referring to FIG. 3B, since the relief manager responsible for New Orleans, who uses the computer 112A, is not a member of the virtual repository "Power Outages—Slidell," the power outages in Slidell are not shown on the computer 112A.

FIG. 3D shows a map 331 of New Orleans and Slidell being rendered by the geo-collaboration software 130 at computer 112C in accordance with the present invention. As a member of both the Slidell Power Outage and the New Orleans virtual repositories, the layer pane 332 contains both the Power off—Slidell and Power Off—New Orleans layers. As a result, the map viewer 330 renders icons 313A-313C which represent locations in New Orleans where the power is off and icons 323A-323C which represent locations in Slidell where the power is off. The utility manager responsible for the entire state of Louisiana utilizing computer 112C has view or map perspective of power outages commensurate with his or her area of responsibility.

It should be noted that the map viewers at computers 112A and 112B do not render map layers associated with a virtual repository to which a user is not a member. This asymmetric geographical information management feature allows geospatial information to be shared on an as needed basis. Since the manager responsible for the entire state of Louisiana, for example, has access to both the power outage layers, the manager may add additional points of interest to either of these layers such as other power outages, the location of service personnel, and the like. Once these additional points of interest are added to the layers, geo-collaboration software 130 being executed on computers 112A and 112B will render these additional points in the maps on computers 112A and 112B.

If all the computers are communicating over the network at the time, additional points of interest are added, the additional points of interest will be automatically rendered at substantially the same time at all the computers. The idea of substantially the same time as used herein includes any delays in transmitting information through a network. If, for example, computer 112A was not communicating with the network 220 at the time the manager added the additional points of interest, computer 112A will render the additional points of interest once the computer 112A communicates over the network 220. If, for example, the manager added the additional points of interest while computer 112C was not communicating with the network 220, the additional points of interest will be rendered at computers 112A and 112B after computer 112C begins communicating with network 220. How the geo-collaboration software 130 provides updates between computers is addressed further in connection with the discussion of FIG. 5.

Figure 3E:
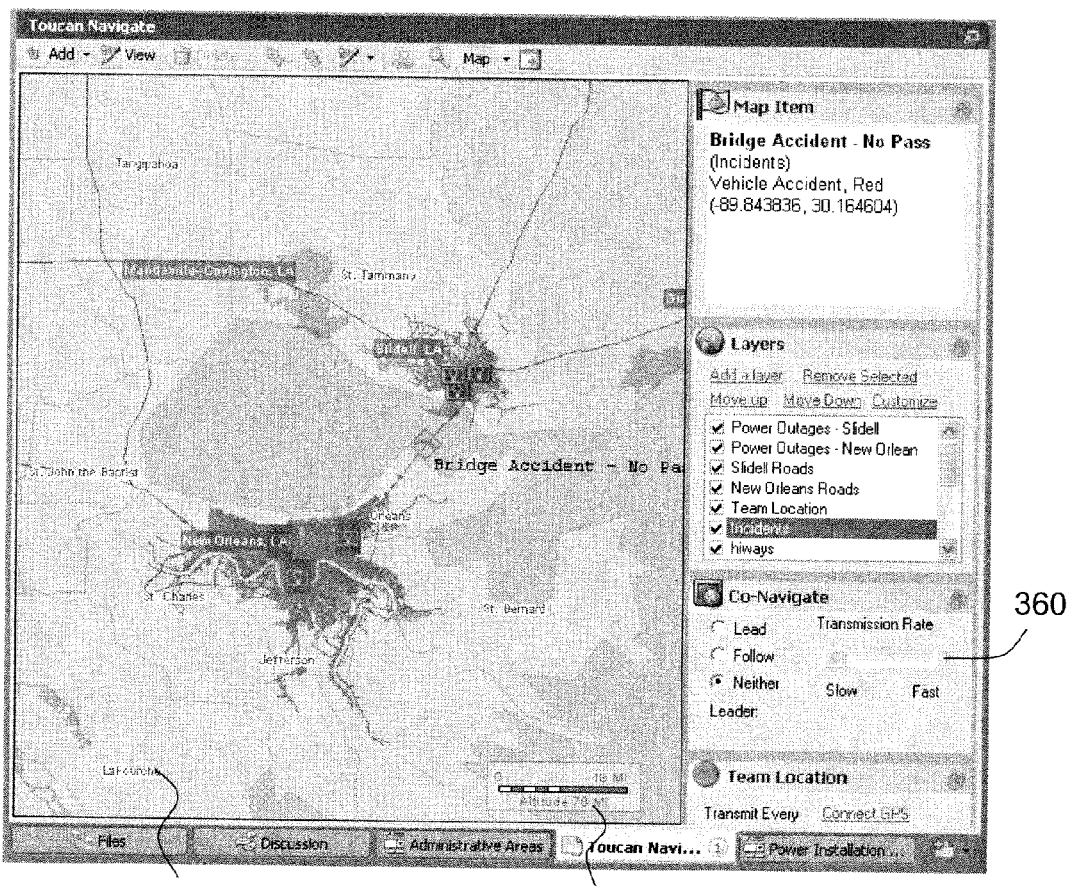
FIG. 3E shows a view perspective of a map of New Orleans and Slidell being rendered by the geo-collaboration software at computer 112C before acting as a leader in accordance with the present invention.
Figure 3F:
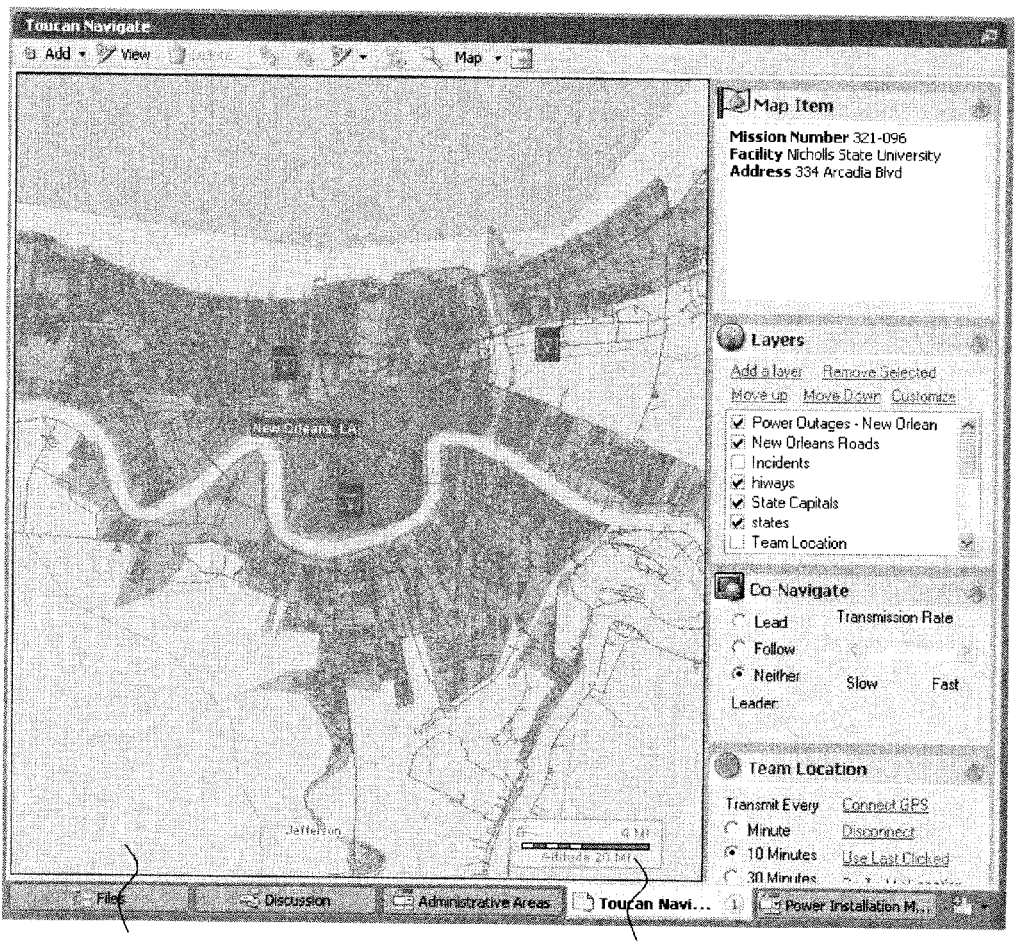
FIG. 3F shows a view perspective of a map of New Orleans, La. being rendered by the geo-collaboration software at computer 112A before acting as a follower in accordance with the present invention.
Figure 3G:
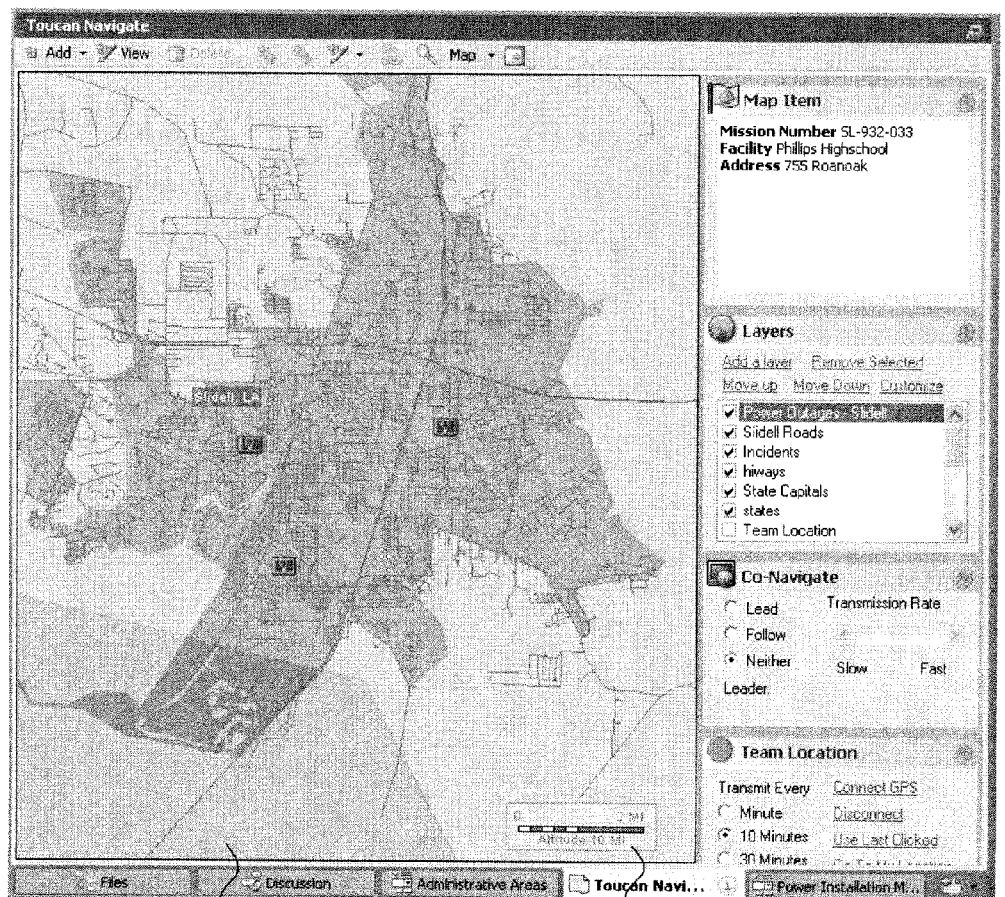
FIG. 3G shows a view perspective of a map of Slidell, La. being rendered by the geo-collaboration software at computer 112B before acting as a follower in accordance with the present invention.
Figure 3H:
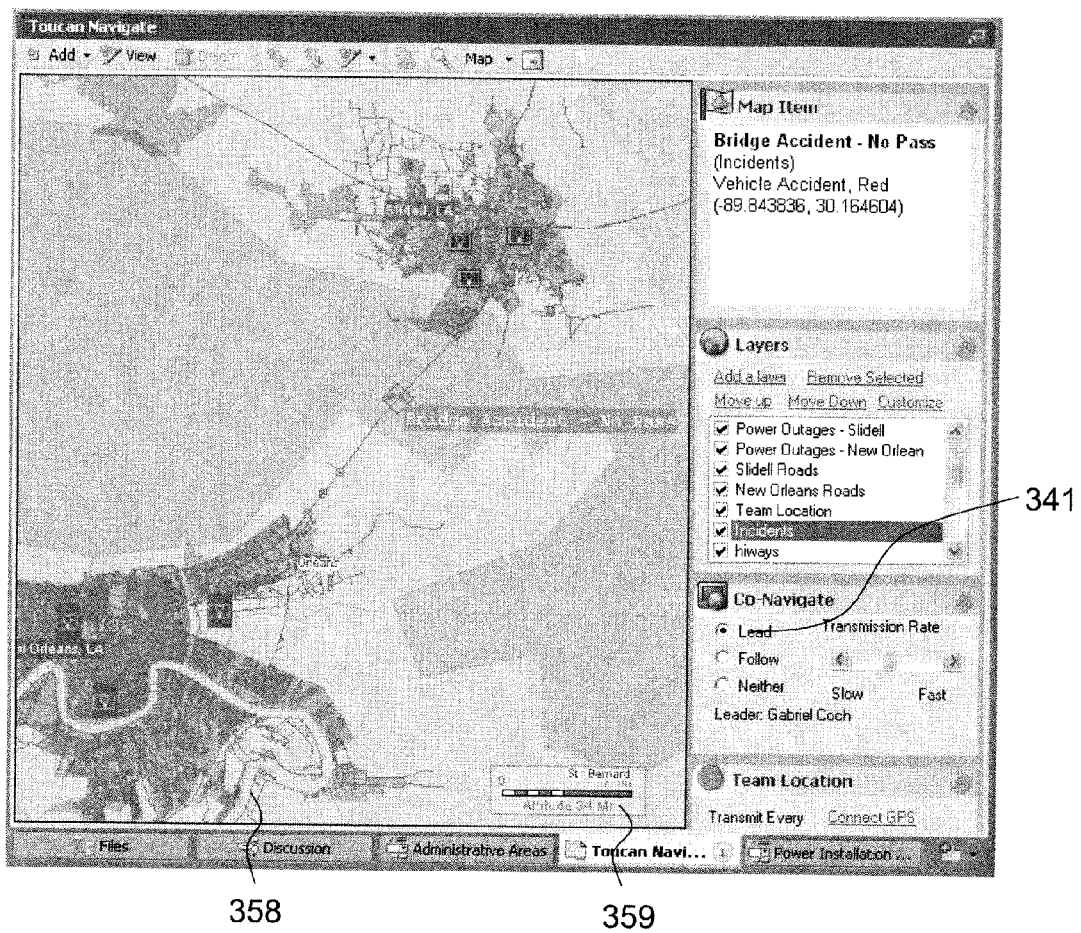
FIG. 3H shows a view perspective of a map of New Orleans and Slidell being rendered by the geo-collaboration software at computer 112C while acting as a leader in accordance with the present invention.
Figure 3I:
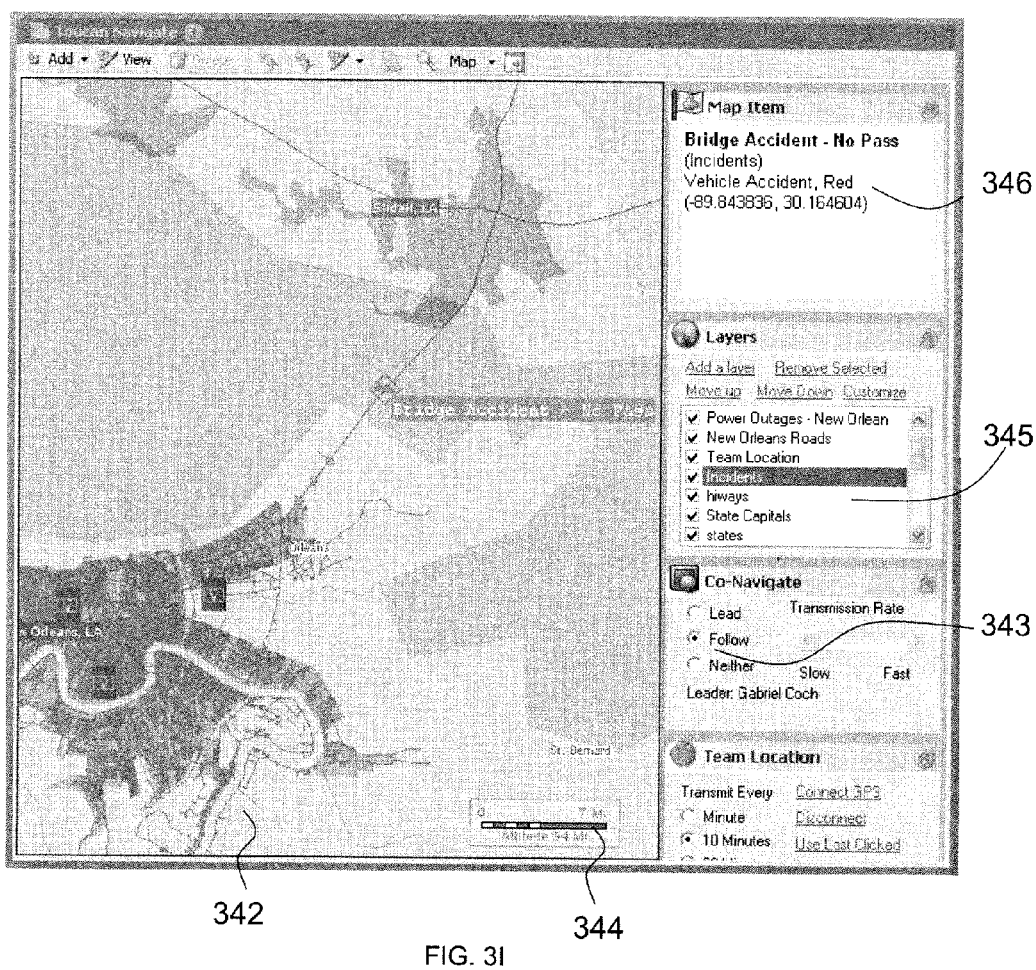
FIG. 3I shows a view perspective of a map of New Orleans, La. being rendered by the geo-collaboration software at computer 112A while acting as a follower in accordance with the present invention.
Figure 3J:
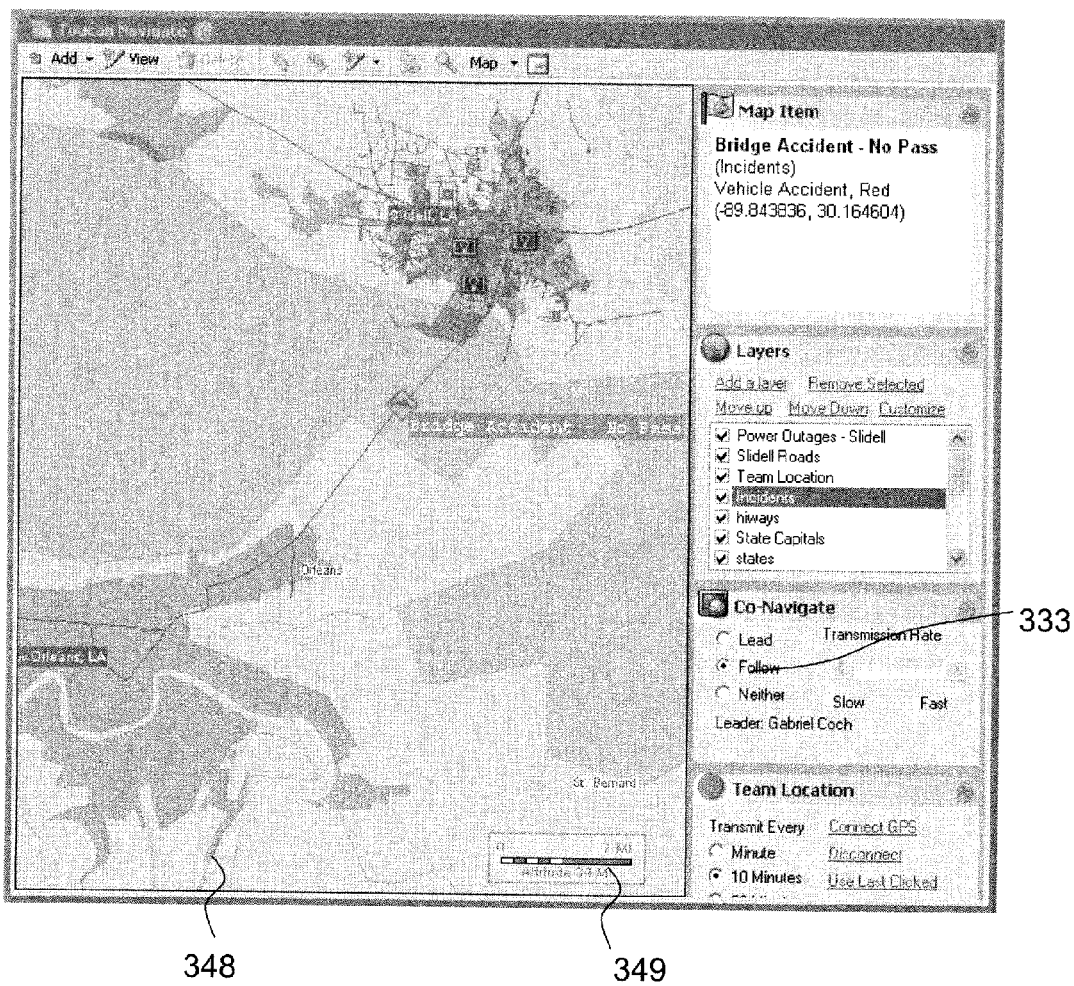
FIG. 3J shows a view perspective of a map of Slidell, La. being rendered by the geo-collaboration software at computer 112B while acting as a follower in accordance with the present invention.

FIGS. 3E-3J illustrate the co-navigation feature of geo-collaboration software 130 in accordance with the present invention. Co-navigation provides users of a shared virtual repository located at various locations to have the same view perspective of a map as one of the users, called the leader. The leader establishes the view perspective and shares that view perspective with the other users of the virtual repository, called followers. FIGS. 3E-3G are map perspectives being automatically rendered at substantially the same time at computers 112C, 112A, and 112B, respectively, before the co-navigation feature is invoked. FIGS. 3H-3J are map perspectives being automatically rendered at substantially the same time at computers 112C (leader), 112A (first follower), and 112B (second follower), respectively, while the co-navigation feature is invoked.

FIG. 3E shows a view perspective 353 of a map of New Orleans and Slidell being rendered by the geo-collaboration software at computer 112C before that computer begins acting as a leader in accordance with the present invention. The view perspective 353 includes an altitude indicator 352 indicating that view perspective 353 is from an altitude of 78 miles above sea level. Referring to the Co-Navigate pane 360, the user at computer 112C is informed that he or she is not participating in a co-navigation session by the "neither" button being selected.

FIG. 3F shows a view perspective 354 of a map of New Orleans, La. being rendered by the geo-collaboration software 130 at computer 112A before that computer begins acting as a follower in accordance with the present invention. The view perspective 354 includes an altitude indicator 355 indicating that view perspective 354 is from an altitude of 20 miles above sea level.

FIG. 3G shows a view perspective 356 of a map of Slidell, La. being rendered by the geo-collaboration software 130 at computer 112B before that computer begins acting as a follower in accordance with the present invention. The view perspective 356 includes an altitude indicator 357 indicating that view perspective 356 is from an altitude of 10 miles above sea level.

FIGS. 3H-3J are map perspectives being automatically rendered at substantially the same time at computers 112C, 112A, and 112B, respectively, while the co-navigation feature is invoked.

FIG. 3H shows a view perspective 358 of a map of New Orleans and Slidell being rendered by the geo-collaboration software 130 at computer 112C while acting as a leader in accordance with the present invention. The user of computer 112C has invoked the co-navigation feature by selecting the lead button 341. While viewing FIG. 3E, the user of computer 112C has zoomed in to a bridge accident. Indicator 359 indicates that the view perspective 358 is from an altitude of 34 miles. For purposes of this example, it is assumed users at computers 112A and 112B have joined the co-navigation session.

FIG. 3I shows a view perspective 342 of a map of New Orleans, La. being rendered by the geo-collaboration software 130 at computer 112A while acting as a follower in accordance with the present invention. The follow button 343 selection indicates that the user of computer 112A has requested and has now joined the co-navigation session with computer 112C. View perspective 342 has an altitude indicator 344 indicating that the view perspective 342 is from an altitude of 34 miles, equivalent to view perspective 358. While in the co-navigation session, wherever the user of computer 112C moves his or her map perspective, the user of computer 112A will automatically view his or her map from the same map perspective being viewed at computer 112C.

It should be noted that since the user of computer 112A is a member of New Orleans Power Outage virtual repository sees only the map layers associated with the New Orleans Power Outage virtual repository such as the power outages in New Orleans. The New Orleans Power Outage virtual repository contains the layer incidents 345 which include the map item 346 indicting a bridge accident. Consequently, the user of computer 112A may view the bridge accident 347 in view perspective 342.

FIG. 3J shows a view perspective 348 of a map of Slidell, La. being rendered by the geo-collaboration software 130 at computer 112B while acting as a follower in accordance with the present invention. The selection of follow button 333 indicates that the user of computer 112B has also joined the co-navigation session with computers 112A and 112C as a follower. Like the user of computer 112A, whenever the user of computer 112C changes his or her view perspective, geo-collaboration software 130 of computer 112B renders his or her map from the same view perspective of computer 112C. Consequently, view perspective 348 contains an altitude indicator 349 indicating that the view perspective is from an altitude of 34 miles, the same view perspective of FIG. 3H rendered at computer 112C. Since the user of computer 112B is a member of the Slidell Power Outage virtual repository, he or she only sees power outages in Slidell and does not see the power outages in New Orleans. However, since the incidents layer 345 is shared in both the Slidell Power Outage virtual repository and the New Orleans Power Outage virtual repository, the bridge accident is also rendered in view perspective 348. Further detail of how co-navigation is achieved is addressed in connection with the discussion of FIGS. 7 and 8.

The geo-collaboration software 130 supports various techniques for plotting and sharing the location of a user to a map. For example, a user of geo-collaboration software 130 may click with a pointing device on a map, may input a specific address, or may specify a particular vCard to indicate his or her location. A vCard is an Internet standard for creating and sharing virtual business cards. Additionally, geo-collaboration software 130 may interface to a global positioning system (GPS) and plot the corresponding GPS coordinates onto a shared map.

Figure 3K:
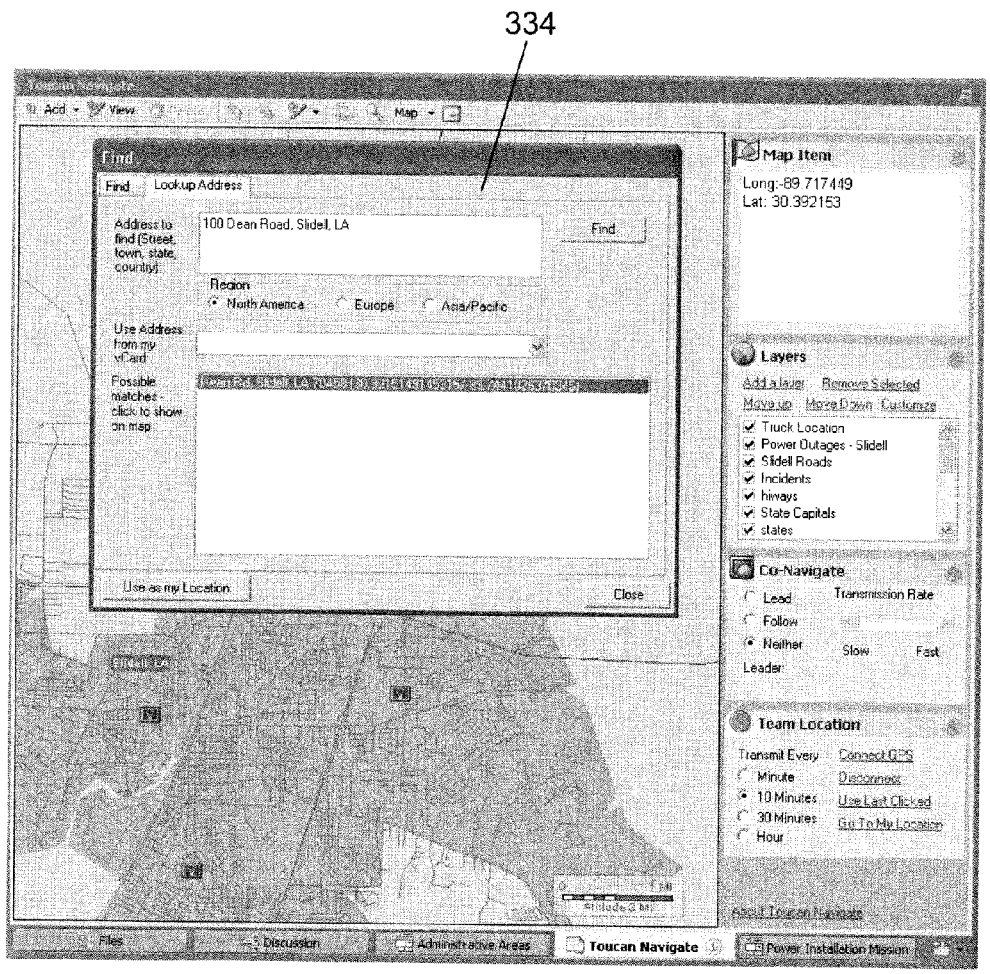
FIG. 3K shows a pop-up screen for plotting and sharing an icon corresponding to an inputted address on to a map in accordance with the present invention.

FIG. 3K shows a pop-up screen 334 for plotting and sharing an icon corresponding to an inputted address in accordance with the present invention. After a user of geo-collaboration software 130 inputs an address into the pop-up screen 334 and clicks the Find button, the geo-collaboration software 130 retrieves geographical coordinates corresponding to the address and plots an icon onto a map according to the retrieved geographical coordinates. For example, the user of computer 112C may be wirelessly connected to network 220 and located in a utility truck 104. The user would input his or her current Slidell address into pop-up screen 334 and would click the Find button.

Figure 3L:
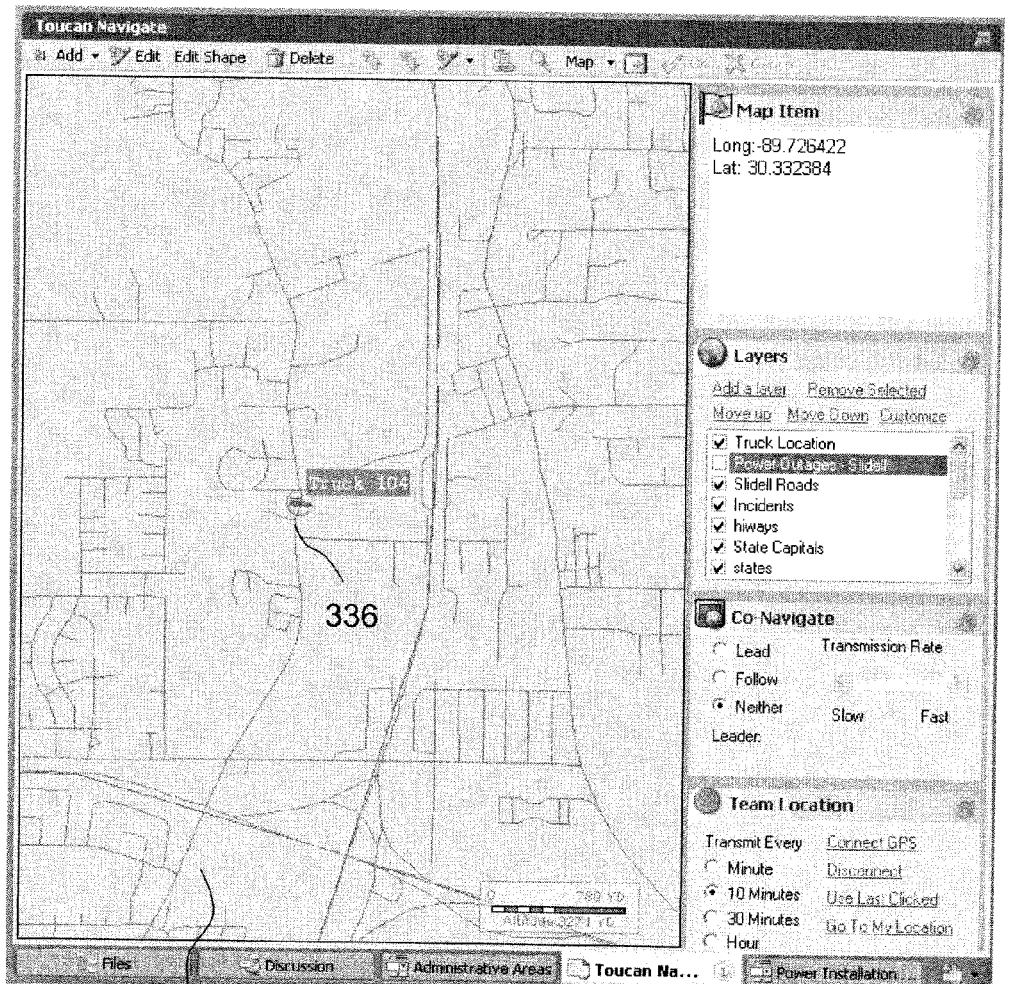
FIG. 3L shows a map with a plotted icon according to the inputted address of FIG. 3K.

FIG. 3L shows a map 335 with a plotted icon 336 according to the inputted address of FIG. 3K. Since the user of computer 112C is a member of both the New Orleans Power Outage and the Slidell Power Outage virtual repositories, the plotted icon 336 will be rendered by geo-collaboration software 130 running on computers 112A and 112B and, thus, shared with users of computers 112A and 112B. It should be noted that the icon of truck 206 of map 335 has had its location plotted from interfacing with a GPS. Further detail of how this location awareness feature is achieved is addressed in connection with the discussion of FIGS. 9 and 10.

Figure 4:
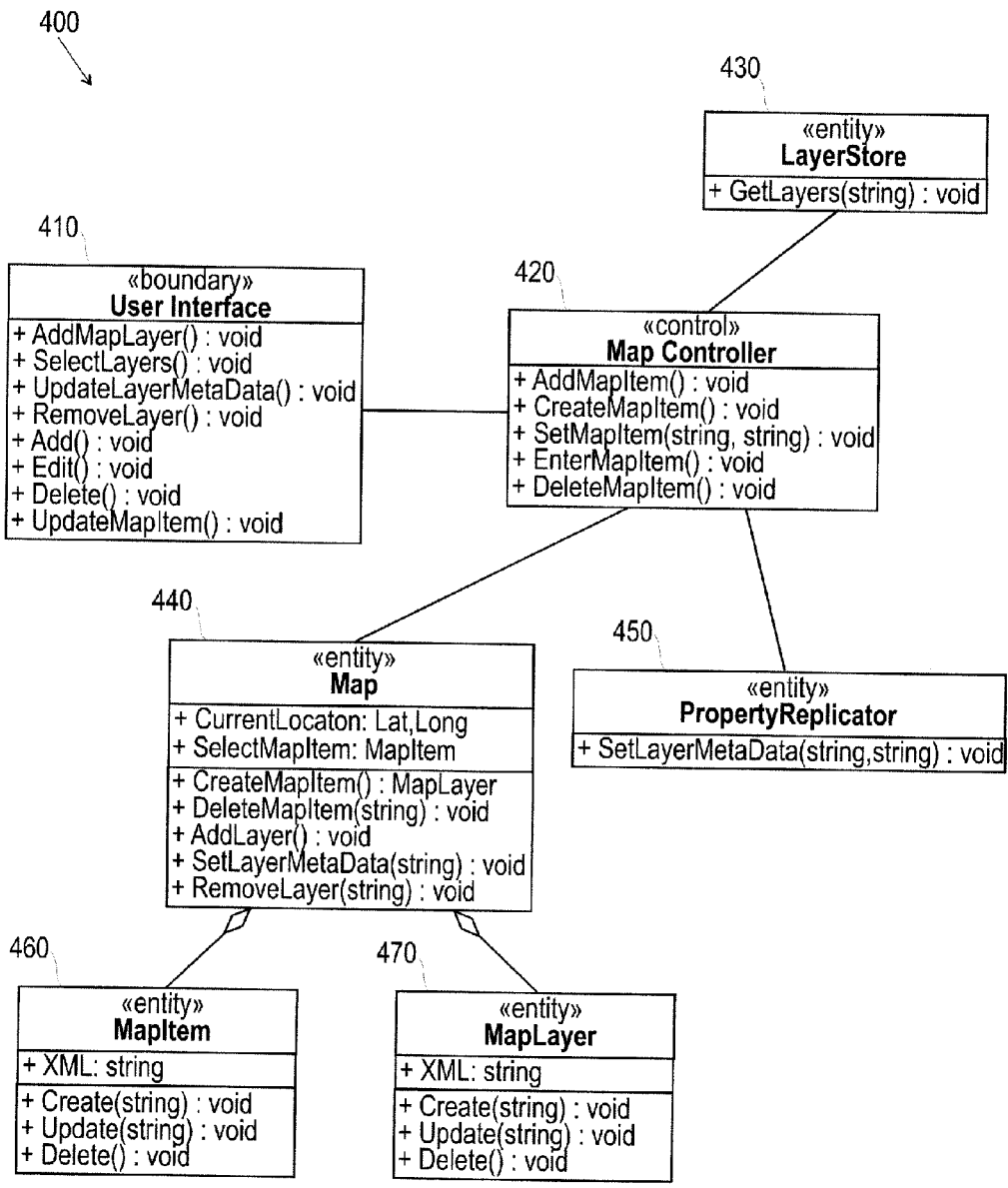
FIG. 4 shows a block diagram of a portion of geo-collaboration software which addresses layer management and map item management between computers in accordance with the present invention.

FIG. 4 shows a block diagram 400 of a portion of geo-collaboration software which performs layer management and map item management between computers in accordance with the present invention. The block diagram 400 shows software classes 410-470 which, when instantiated, interact which each other to accomplish decentralized geographical data updates. The user interface class 410 is responsible for showing the current state of the geo-collaboration software application 130 to the user and acting as a means with which the user can modify map data and map layers. The map controller class 420 is responsible for coordinating the other class instances that make up the geo-collaboration software application 130.

LayerStore class 430 encapsulates any persistent storage such as a hard drive, file directory, web service, or database used to map data. MapItem class 460 represents a point, lines including roads, shapes, and other data constructs with a geographic element such as observations or location reports. MapLayer class 470 may contain one or more MapItems that share a common set of characteristics such as display properties. Map class 440 is responsible for the display of MapItem class instances and MapLayer class instances. PropertyReplicator class 450 is responsible for asynchronously disseminating the definitions of MapItem and MapLayer instances to other computers executing geo-collaboration software 130. The definitions of MapItems and MapLayers may be encoded in extended markup language (XML), binary objects, serial objects, or any other suitable format. The operations of these classes will be further described in connection with FIGS. 5 and 6. It should be noted that in this context the terms class instance or object mean an instantiation in memory of a corresponding class during run time of the geo-collaboration software 130.

Figure 5A:
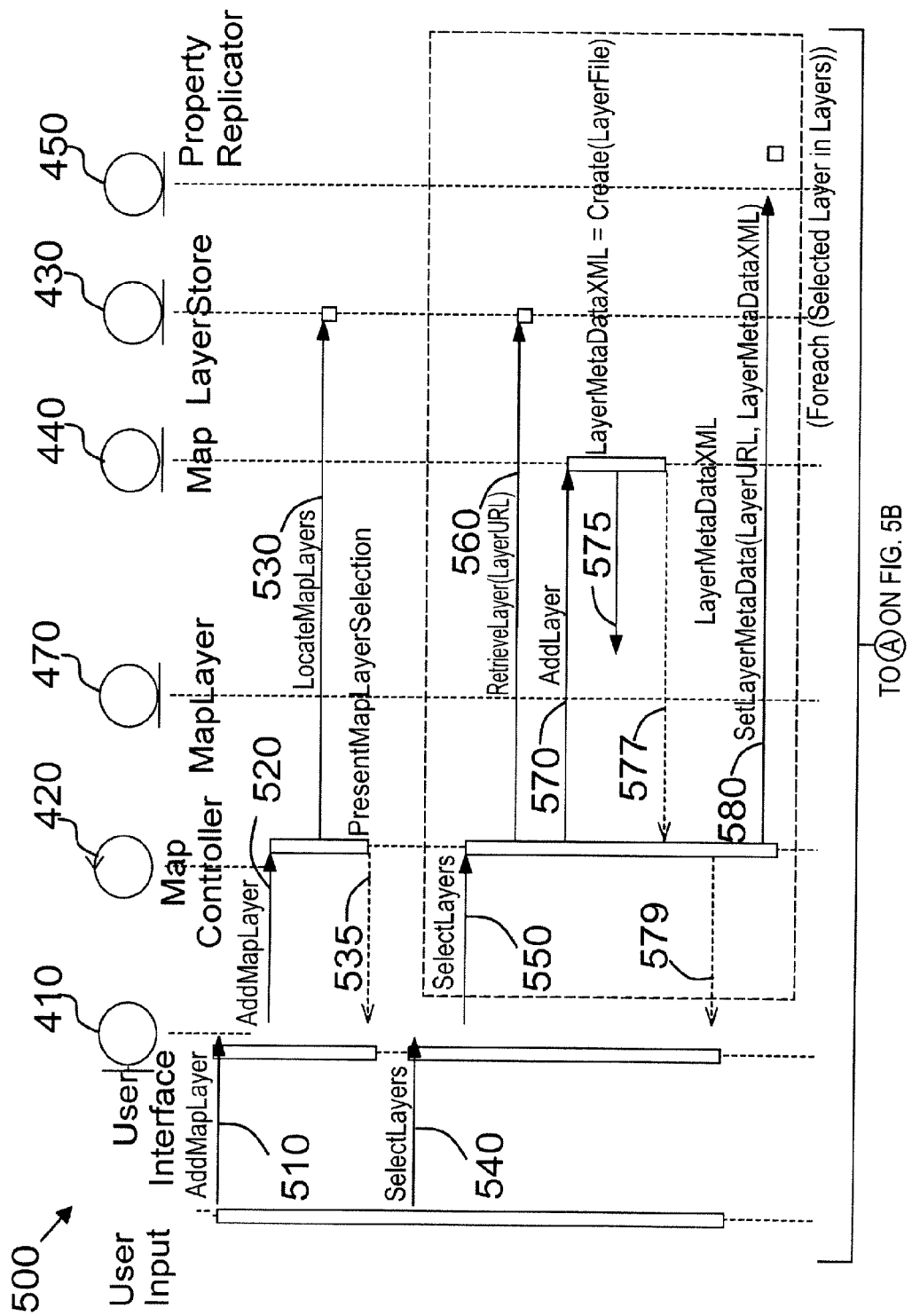
FIG. 5 shows a calling sequence illustrating the interactions of the software class instances of FIG. 4 for adding and removing map layers.

FIG. 5 shows a calling sequence 500 illustrating the interactions of the software class instances of FIG. 4 for adding and removing map layers in the geo-collaboration software 130. In the calling sequence, the method calls 510, 520, 530, 540, 550, 560, 570, 580, and 590 are executed by a computer, such as computer 112A running geo-collaboration software 130. Method calls 512 and 522 are executed by computer 112A and any other computers such as computers 112B and 112C running geo-collaboration software 130 whose users are members of the same virtual repository.

A user of geo-collaboration software 130 executing on computer 112A wanting to share a map layer containing his or her favorite bicycle training routes through the city with users at computers 112B and 112C is an example of when the sequence of method calls 510, 520, 530, 540, 550, 560, 570, 580, and 590 are executed. Or, as described above, the manager responsible for addressing power outages in the state of Louisiana may want to report locations of utility service personnel to other coworkers. To add the map layer to a map, a user selects the "Add" pull down menu accessible from toolbar 320. Upon clicking on the add feature, the AddMapLayer( ) method 510 on the User Interface class 410 is called. AddMapLayer( ) method 510 then calls AddMapLayer( ) method 520 on the Map Controller class 420. The AddMapLayer( ) method 520 calls the LocateMapLayers( ) method 530 on the LayerStore class 430 and retrieves map layers accessible through the repository encapsulated by the LayerStore class 430. The PresentMapLayerSelection( ) method 535 returns the retrieved map layers and their associated metadata including their position to the user.

Upon retrieving the map layers, these selectable layers may be presented through the layers pane 350. The user selects one or more map layers to be added to the shared map and, thus, to be aggregated by the map viewer 310. The SelectLayers( ) method 540 is called on the User Interface class 410. The SelectLayers( ) method 540 calls the SelectLayers( ) method 550 on the Map Controller class 420. The SelectLayers( ) method 550 calls the RetrieveLayer( ) method 560 on the LayerStore class 430, the AddLayer( ) method 570 on the Map class 440 and the SetLayerMetaData( ) method 580 on the PropertyReplicator class 450. The RetrieveLayer( ) method 560 retrieves the selected layer from the LayerStore 430, saves the selected layer and associated metadata and configuration and data files to the local computer 112A.

Metadata for a layer describes characteristics of the layer such as the layer's name, whether it is visible, what display styles it contains, and the like. An exemplary layer style may include information to render all point map objects on a layer with the true type font symbol for an airport using red 22 point type.

The AddLayer( ) method 570 adds the selected layer and the associated metadata and configuration and data files to the Map class instance 430. In so doing, the create( ) method 575 creates a new map layer and returns the select layer's XML or other binary or serial representation of the layer to the MapLayer class 470. The LayerMetaDataXML( ) method 577 returns the selected layer's XML to the Map Controller class 420 which in turn returns the selected layer's XML to the User Interface class 410 at time 579.

The Map Controller class 420 then calls the SetLayerMetaData( ) method 580 on the PropertyReplicator class 450. The SetLayerMetaData( ) method 580 updates the PropertyReplicator class 450 with the selected layer's XML data and disseminates the selected layer's XML data to other members running the geo-collaboration software 130. Although not shown in sequence diagram 500, the PropertyReplicator class 450 interfaces with collaboration software 140 in order for collaboration software 140 to synchronize information such as the selected layer's XML data between computers 112A-112C. When computer 112A is communicating with the network 220, the SetLayerMetaData( ) method 580 communicates with the PropertyReplicator Class 450 on computers running geo-collaboration software 130 which share the same virtual repository. For this example, the PropertyReplicator Class 450 executing on computer 112A communicates the selected layer's XML data with the PropertyReplicator Classes executing on computers 112B-112C, since the users of computers 112B and 112C are members of the same virtual repository. The sequence of calls to RetrieveLayer( ) method 560, AddLayer( ) method 570, create( ) method 575, LayerMetaDataXML( ) method 577, and SetLayerMetaData( ) method 580 are made for each layer selected by the user.

If computer 112A is not communicating with network 220, the PropertyReplicator class 450 temporarily stores or buffers the selected layer's XML data until computer 112A begins communicating with network 220. The PropertyReplicator class 450 transmits the buffered information to collaboration software 140 once computer 112A communicates with network 220. Alternatively, an additional computer may be used to act as a mailbox for offline users. In this alternative, the PropertyReplicator class 450 transmits the information to the additional computer so that the offline computer can retrieve the updates once it connects to the network.

The SetLayerMetaData( ) method 580 asynchronously calls the SetLayerMetaData( ) method 590 on computers 112B and 112C to communicate XML data describing the selected layer. The SetLayerMetaData( ) method 590 on computers 112A-112C updates the selected layer in XML format on the respective machines. The SetLayerMetaData( ) method 590 on computers 112A-112C communicate the XML data describing the selected layer with their respective map controllers by calling the SetLayerMetaData( ) method 512 on the Map Controller class 420 on computers 112A-112C. The Map Controller class 420 on each of computers 112A-112C determines whether the selected layer is available and whether a layer file corresponding to the XML data has been added to the map. If the corresponding layer file is not available, the SetLayerMetaData( ) method 512 does nothing. If the corresponding layer file is available, but has yet to be added to the map, the SetLayerMetaData( ) method 512 adds the corresponding layer file to the map. If the corresponding layer file has been added to the map, the SetLayerMetaData( ) method 512 running on each computer updates the corresponding layer file with the received XML data by calling its respective SetLayerMetaData( ) method 522 on its respective Map class 440. Once updated, map viewer 310 on computers 112A-112C will render the updated map on computers 112A-112C.

The methods 532, 542, 552, 553, and 562 of the sequence diagram 500 describe an example of a user updating the contents of a particular map layer. For example, a user of computer 112A wants to add his or her personal location to a map layer and have that personal location shared with users at computer 112B and 112C. Through the toolbar 320, the user interacts with the map viewer 310 to have the UpdateLayerMetadata( ) method 532 called on the user interface class 410. The UpdateLayerMetadata( ) method 532 receives a command indicating what customization a user wants to make to a map layer such as his or her location, a graphical incident, or the like. The UpdateLayerMetadata( ) method 532 calls the GetLayerMetaData( ) method 542 on the Map Controller class 420. The GetLayerMetaData( ) method 542, in turn, retrieves layer metadata corresponding to the map layer the user wants to customize by calling the GetLayerMetaData( ) method 552 on the MapLayer class 470. Once returned, the Map Controller 420 calls the EditMapLayerMetaData( ) method 553 on the User Interface class 410 to provide the layer metadata to the User Interface class 410. The user of computer 112A may add his or her personal location to the layer metadata. If the user is content with such changes, the updated layer metadata is sent to the PropertyReplicator class 450 by calling the method SetLayerMetaData( ) method 562 to propagate the updated metadata to other users on computers 112A-112C as described in methods 590, 512, and 522 above.

The methods 572, 582, 592, 514, 534, 544, and 554 of the sequence diagram 500 describe an example of a user removing a layer from a map. For example, the user of computer 112A wants to remove a map layer showing his or her favorite bicycle training routes from being shared with the users at computer 112B-112C. The user selects the map layer he or she want removed from the toolbar 320 to have the RemoveMapLayer( ) method 572 called on the User Interface class 410. The RemoveMapLayer( ) method 572 calls the RemoveMapLayer( ) method 582 on the Map Controller class 420. The RemoveMapLayer( ) method 582 calls the RemoveLayer( ) method 592 on the PropertyReplicator class 450 to remove the metadata corresponding to the selected map layer from the PropertyReplicator class 450. The RemoveLayer( ) method 592 asynchronously calls the RemoveLayer( ) method 592 on PropertyReplicator classes being executed by computers 112A-112C. The asynchronous call typically includes a message informing the computers 112A-112C that the selected layer is to be removed from the map.

Methods 514, 524, 534, 544, and 554 are executed by the geo-collaboration software 130 being executed on computers 112A-112C. The RemoveLayer( ) method 592 asynchronously receives the message and informs the Map Controller class 420 by calling the RemoveLayer( ) method 524. The RemoveLayer( ) method 524 calls the RemoveLayer( ) method 534 on the Map class 440 to remove the select layer from the Map class 440. The RemoveLayer( ) method 534 calls the Delete( ) method 544 on the MapLayer class 470 to delete the MapLayer instance corresponding to the selected layer. After deletion of the MapLayer instance, RemoveLayer( ) method 524 calls the Update( ) method 554 on the User Interface class 410 in order for the map viewer 300 to render the map without the selected layer.

Figure 6A:
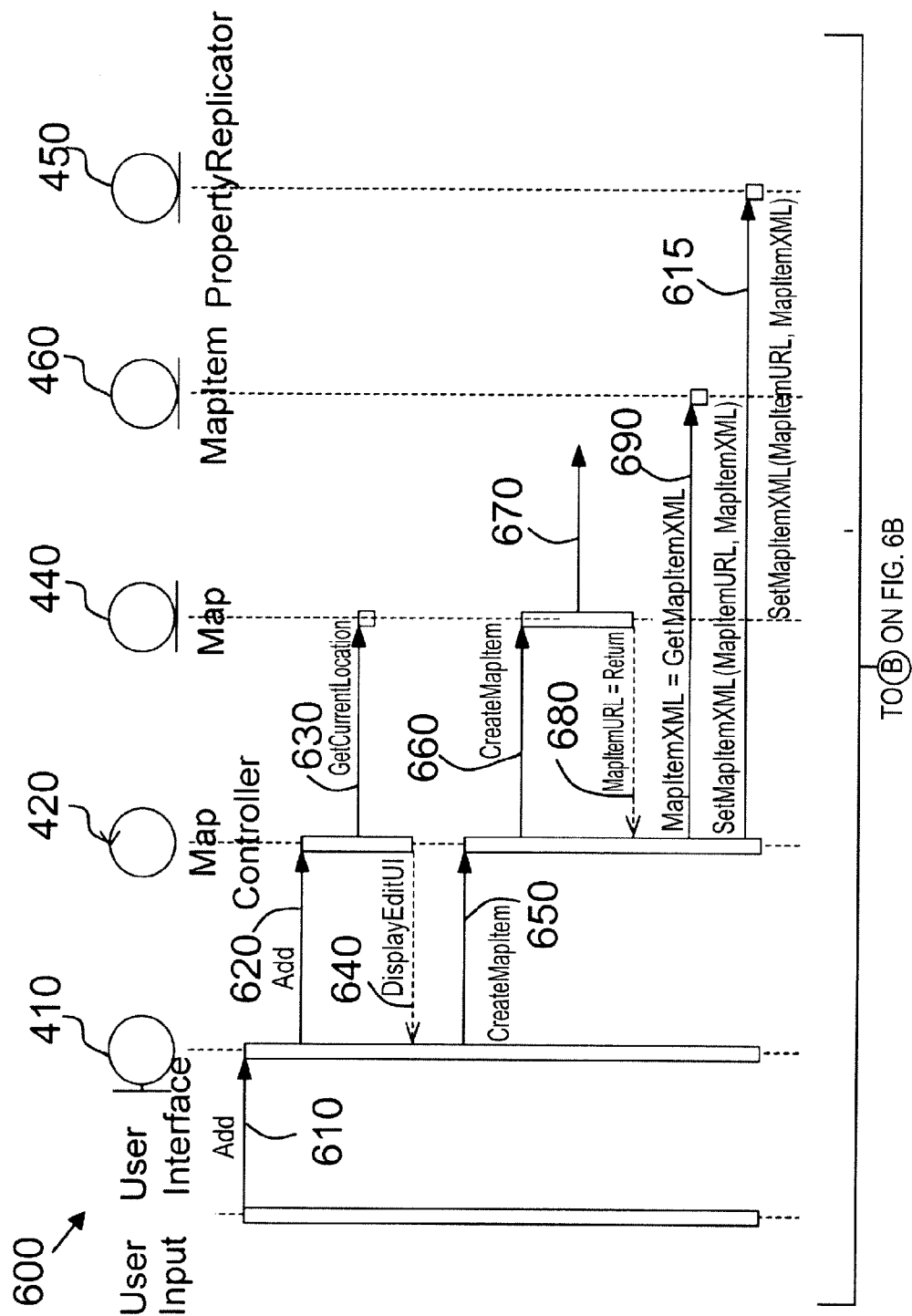
FIG. 6 shows a calling sequence illustrating the interaction of the software objects of FIG. 4 for adding items to a map.

FIG. 6 shows a calling sequence 600 illustrating the interaction of the software objects of FIG. 4 for adding items such as a person's current location, a line, an area, an object and the like to a map. Using this calling sequence 600, a user of geo-collaboration software 130 executing on computer 112A can add geo-spatial information such as a location of a person, a point of interest, lines, roads, evacuation routes, no entry areas, risk areas, and the like and share this information with users of computers 112B and 112C. Geo-spatial information is represented internally to the geo-collaboration software 130 as a map item. To do so, the sequence of method calls 610, 620, 630, 640, 650, 660, 670, 680, 690, 615, 625, 635, 645, and 655 are executed to create a MapItem instance and share it with users on computers 112B and 112C. For example, the user selects from the toolbar 320 to have the Add( ) method 610 called on the User Interface class 410. The Add( ) method 610 calls the Add( ) method 620 on the Map Controller class 420 to specify a command indicating that the type of item to be added to the map. The Add( ) method 620 calls the GetCurrentLocation( ) method 630 to obtain a current map location from the Map class 440. The current map location is the last place the user clicked on the map such as map 330. This clicked position is used as the center point for whatever type of object is being added to the map. The Add( ) method 620 then displays an appropriate editor for the type of item to be displayed to the user by calling the DisplayEditUI( ) method 640. For example, a drawing editor would be displayed if the user wants to specify a line or polygon to be added to the map.

Once the user indicates he or she wants to save the newly created item with the display editor, the CreateMapItem( ) method 650 is called on the Map Controller 420. The CreateMapItem( ) method 650, in turn, calls the Create MapItem( ) method 660 on the Map class 440. The Create MapItem( ) method 660, in turn, instantiates a MapItem class instance 460 at time 670 and returns a unique identifier for the newly create MapItem instance at time 680. Upon receiving the unique identifier of the newly created MapItem, the CreateMapItem( ) method 650 retrieves the XML representation of the newly created MapItem by calling the GetMapItemXML( ) method 690 on the MapItem instance. The CreateMapItem( ) method 650 then informs the PropertyReplicator 450 of the XML representation by calling SetMapItemXML( ) method 615. The SetMapItemXML( ) method 615 updates the PropertyReplicator with the newly created MapItem's XML representation and informs the other PropertyReplicators being executed on computers 112B-112C by asynchronously calling SetMapItemXML( ) method 625.

Method calls 625, 635, 645, and 655 are executed by geo-collaboration software 130 executing on computers 112B-112C. SetMapItemXML( ) method 625 asynchronously receives the MapItem's XML representation and subsequently calls the SetMapItem( ) method 635 on the Map Controller class 420. The SetMapItem( ) method 635 calls the MapItem class 460 to draw the MapItem instance on the map according to the XML representation received. If the MapItem previously existed, it is redrawn according to the received XML representation. For completeness, the SetMapItem( ) method 635 calls the Update( ) method 655 to update the User Interface class 410 with non-Map portions of the new MapItem details. For example, if there is a lot of text such as a long address associated with a location, the location may be indicated with a graphic on the map and the text may be displayed in the map item pane 340.

Method calls 665, 675, 685, 695, 612, 622, and 632 are executed by geo-collaboration software 130 on computer 112A when, for example, a user wants to edit an existing map item. To do so, the user indicates the map item he or she wants to edit by selecting it from the displayed map and making a selection which results in invoking the Edit( ) method 665 on the User Interface class 410. The Edit( ) method 665 calls the Edit( ) method 675 on the Map Controller class 420. The Edit( ) method 675 retrieves the corresponding MapItem instance by calling the GetSelected( ) method 685 on the Map class 440. At time 695, the selected MapItem instance is returned to the Map Controller class 420. Based on the type of the selected MapItem instance, the Edit( ) method 675 invokes an appropriate editor for editing the selected map item by calling the DisplayEditUI( ) method 612. The Edit( ) method 665 now retrieves the XML representation of the selected map item by calling the GetMapItemXML( ) method 622 on the Map Item class 460. After retrieving the corresponding XML representation, the SetMapItemXML( ) method 632 is called on the PropertyReplicator class 450 to update the ProperReplicator class 450 and inform the ProperReplicator classes executing on computers 112B-112C. The sequence of method calls 625, 635, 645, and 655 are performed as described above to replicate the XML representation of the edited map item and to render the updated map item on computers 112A-112C.

The methods 642, 652, 662, 672, 682, 683, 692, 617, 627, and 637 of the sequence diagram 600 describe the interaction of software classes 410, 420, 440, 450, and 460 when a user want to delete a map item. For example when a meeting is cancelled, the user of computer 112A wants to remove the map item for a meeting location where the users of computers 112A-112C were planning to meet. The user indicates that he or she wants to delete the map item by selecting it on the map displayed by map viewer 300 and choosing a delete command accessible through the toolbar 320. The Delete( ) method 642 is then called on the User Interface class 410. The Delete( ) method 642, in turn, calls the Delete( ) method 652 on the Map Controller 420 to indicate to the Map Controller that the corresponding MapItem instance is to be deleted. The Delete( ) method 652 calls the GetSelected( ) method 662 to retrieve the MapItem instance corresponding to the selection made by the user on the User Interface class 410. At time 672, the uniform resource locator (URL) for the selected MapItem instance is returned to the Map Controller class 420. The Delete( ) method 652 calls the DeleteMapItem( ) method 682 on the PropertyReplicator class 450 to remove the URL of the selected MapItem instance from the PropertyReplicator class 450 and the PropertyReplicator classes being executed on computers 112B-112C. The DeleteMapItem( ) method 682 asynchronously calls the PropertyReplicator classes on computers 112B-C.

The methods 683, 692, 617, 627, and 637 are executed by geo-collaboration software 130 which is run on computers 112A-112C. DeleteMapItem( ) method 683 asynchronously receives notification containing the URL of a map item that needs to be deleted and calls the DeleteMapItem( ) method 692 on the Map Controller class 420. The DeleteMapItem( ) method 692 calls the Delete( ) method 617 on the Map class 440 with the URL corresponding to the MapItem instance to be deleted. The Delete( ) method 617 removes the association of the URL with the MapItem instance. The Delete( ) method 617 deletes the MapItem instance from memory by calling the Delete( ) method 627. The DeleteMapItem( ) method 692 then removes the selected map item from the being rendered by the map viewer 310 by calling Update( ) method 637 on the User Interface class 410.

Figure 7:
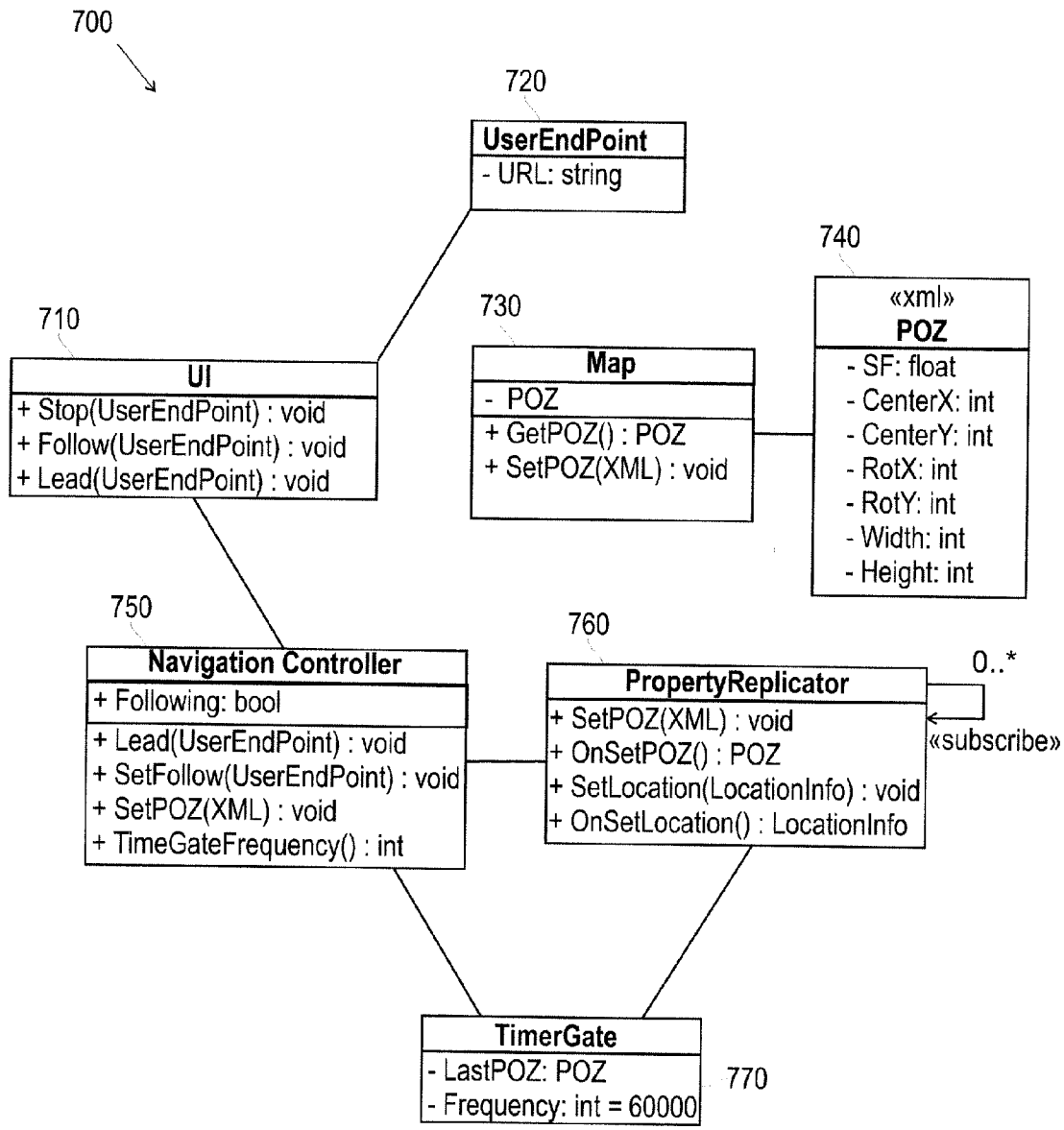
FIG. 7 shows a block diagram of a portion of geo-collaboration software which addresses co-navigating a map shared between two or more computers in accordance with the present invention.

FIG. 7 shows a block diagram 700 of a portion of geo-collaboration software which addresses co-navigating a map as illustrated in FIGS. 3E-3G shared between computers in accordance with the present invention. It should be noted that co-navigating between two or more computers presumes that the users of the two or more computers share or are members of the same virtual repository. The block diagram 700 shows software classes 710-770 which, when instantiated, interact which each other to accomplish co-navigation between two or more computers. The user interface (UI) class 710 is the main user interface class whose methods are accessed by a user through co-navigate pane 360. The UserEndPoint class 720 identifies a unique combination of computers and users. Each user can have UserEndPoints on a number of computers and each computer can have UserEndPoints for a number of users. For example, the same user may operate two computers, a laptop and a workstation. One UserEndPoint instance would uniquely identify the user operating the laptop and another UserEndPoint instance would uniquely identify the user operating the workstation. The Map class 730 is responsible for rendering a map image to a computer screen. The position orientation zoom (POZ) class 740 preferably contains a minimum set of fields to describe a map perspective currently being rendered. For example, a POZ instance would contain information including a scale factor that map data is currently being rendered, the X and Y coordinates of the center of the rendered map image, the amount of rotation of the map image about the X and Y axes, the width of the rendered map image, and the height of the rendered map image. The Navigation-Controller class 750 is responsible for coordinating the interaction between the other software components responsible for achieving co-navigation. In addition to PropertyReplicator class 450, PropertyReplicator class 760 is also responsible for asynchronously propagating a POZ instance to other computers executing geo-collaboration software 130. The Timer-Gate class 770 is responsible for making sure that followers are not swamped with POZ instances which do not contribute to effective co-navigation. The TimerGate class 770 regulates POZ instance traffic by sending only messages containing a POZ instance that differ from the previously sent message and by sending messages only as frequently as the user acting as a leader is specified. The operations of these classes will be further described in connection with FIG. 8.

Figure 8B:
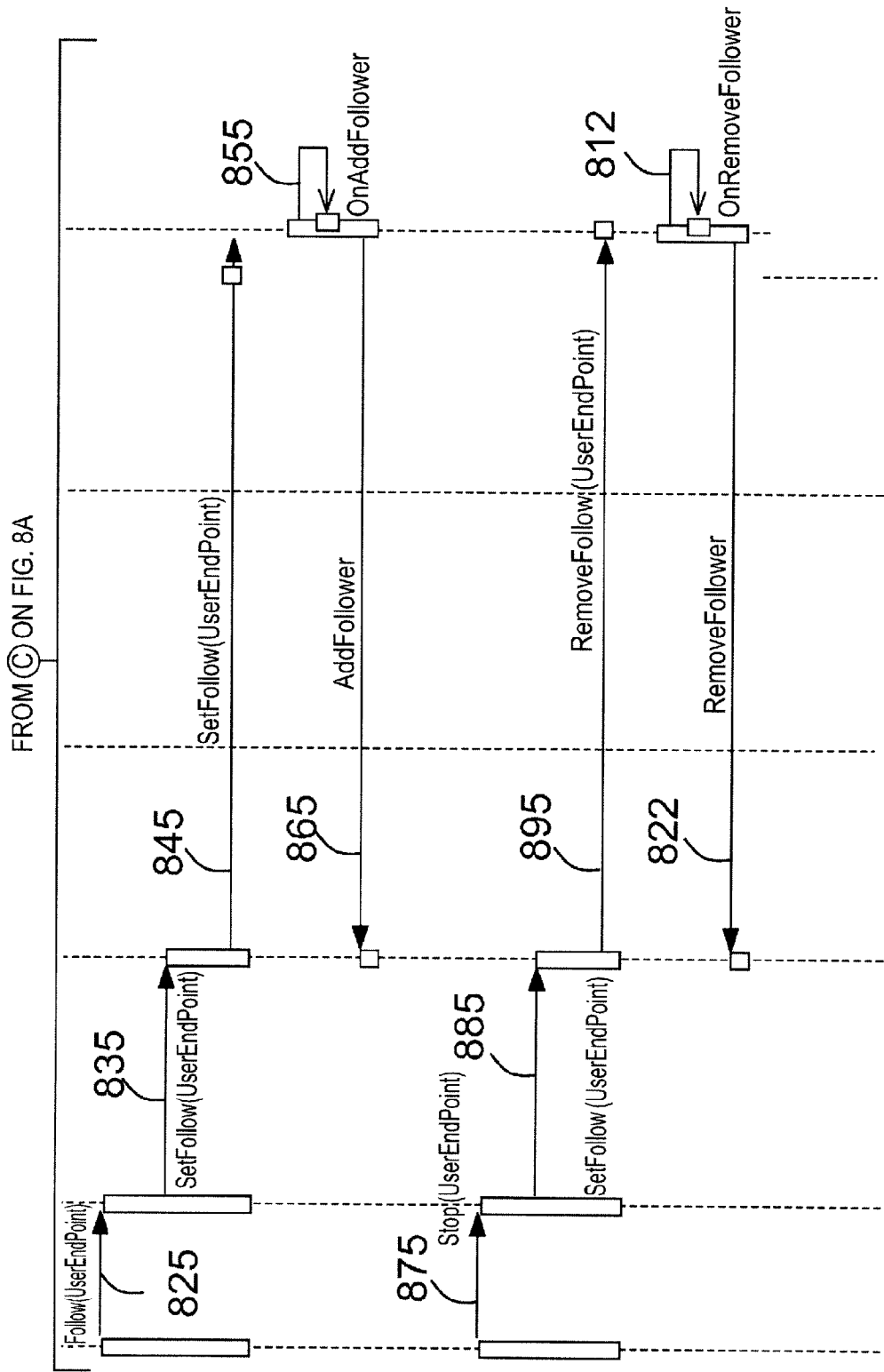
FIG. 8 shows a calling sequence illustrating the interactions of the software class instances of FIG. 7 for co-navigating a map.

FIG. 8 shows a calling sequence 800 illustrating the interactions of the software class instances of FIG. 7 in order to co-navigate a map between two or more computers. The sequence of calls 810, 820, 830, 840, 850, and 860 are performed by geo-collaboration software 130 executed by a computer whose user wants to act as a leader in a co-navigation session.

To initiate a co-navigation session, the user such as the utility manager responsible for the entire state of Louisiana selects the Lead button 363 in co-navigate pane 360 which results in calling the Lead( ) method 810 on the UI class 710. The Lead( ) method 810 calls the Lead( ) method 820 on the NavigationController class 750 to initiate a co-navigation session. The Lead( ) method 820 calls the GetPOZ( ) method 830 to request a POZ instance for the current view of the Map 730. At time 840, the POZ instance for the Map 730 is returned. The Lead( ) method 820 then calls the SetPOZ( ) method 850 on the TimerGate class 770. The SetPOZ( ) method 850 passes the POZ information to the TimerGate class 770 and decides whether a predetermined amount of time has passed since sending the last POZ information before forwarding it on. A user may adjust the predetermined amount of time to send POZ information by adjusting the slide bar 366 of the co-navigate pane 360.

After the predetermined amount of time has passed, the SetPOZ( ) method 850 calls the SetPOZ( ) method 860 on the PropertyReplicator class 760. In response to either a local SetPOZ( ) method 860 call or one received asynchronously from a user running geo-collaboration software 130 on another computer, the OnSetPOZ( ) method 870 is called. It should be noted that the PropertyReplicator class 760 interfaces with collaboration software 140 to send and retrieve information of the network 220.

The OnSetPOZ( ) method 870 is called for all participants including a leader and followers in the co-navigation. A sequence of calls 870, 880, 890, and 815 to update the current view perspective is executed in geo-collaborative software 130 running in each of the user's computer participating in the co-navigation session. The sequence of calls 870, 880, 890, and 815 would be invoked on the leader of the co-navigation and one or more followers of the co-navigation. The OnSet-POZ( ) method 870 calls the SetPOZ( ) method 880 on the NavigationController 750 on each of the participants' computers. The SetPOZ( ) method 880 calls the SetPOZ( ) method 890 on the Map instance 730 on each of the participants' computers. The SetPOZ( ) method 890 instructs the Map instance 730 on each of the participants' computers to focus upon the place specified in the POZ information carried in the POZ instance. The SetPOZ( ) method 880 also calls the ShowPOZ( ) method 815 on the UI class 710. The ShowPOZ( ) method 815 instructs the user interface to display the relevant parts of the map as defined by the POZ information.

The sequence of calls 825, 835, 845, 855, and 865 are executed by a user of geo-collaboration software 130 who wants to act as a follower in a co-navigation. To participate as a follower in a co-navigation session, a user, such as the relief manager responsible New Orleans, selects the Follow button 364 in co-navigate pane 360 which results in calling the Follow( ) method 825 on the UI class 710. The Follow( ) method 825 calls the SetFollow( ) method 835 on the NavigationController class 750 to inform the NavigationController class 750 of the UserEndPoint instance 720 specifying the user requesting to be a follower. The SetFollow( ) method 835 calls the SetFollow( ) method 845 on the PropertyReplicator class 760 to instruct the PropertyReplicator class 760 to advise the leader of this user's interest in following the co-navigation session. The UserEndPoint instance 720 is passed asynchronously through collaboration software 140 to the PropertyReplicator class 760 being executed on the computer whose user is acting as the leader to register the user's interest with the leader's PropertReplicator class 760.

The calling sequence of calls 855 and 865 is executed by geo-collaboration software 130 executing on the leader's computer. The method OnAddFollower( ) 855 asynchronously receives the user's interest in following the co-navigation session by receiving its UserEndpoint instance. The method OnAddFollower( ) 855 calls the AddFollower( ) method 865 on the NavigationController class 750 to register the UserEndpoint instance with the leader's NavigationController class by adding the UserEndpoint instance to the list of followers participating in the co-navigation session. The method OnAddFollower( ) 855 provides a mechanism for the leader of a co-navigation session to maintain a list of followers.

The sequence of calls 875, 885, and 895 is executed by a user of geo-collaboration software 130 who wants to stop acting as a follower in a co-navigation session. The sequence of calls 812 and 822 is executed by a user of geo-collaboration software 130 who is leading the co-navigation session.

To stop participation, the user such as the relief manager responsible New Orleans selects the Neither button 365 in co-navigate pane 360 which results in calling the Stop( ) method 875 on the UI class 710. The Stop( ) method 875 calls the SetFollow( ) method 885 on the NavigationController class 750 with the UserEndPoint instance indicating the unique reference of this user. The SetFollow( ) method 885 calls the RemoveFollower( ) method 895 on the ProperReplicator class 760. The RemoveFollower( ) method 895 asynchronously passes the UserEndpoint instance of the follow to notify the geo-collaboration software 130 executing on the leader's computer that the follower is no longer interested in following the co-navigation session.

On the geo-collaboration software 130 executing on the leader's computer, the OnRemoveFollower( ) method 812 asynchronously receives the UserEndpoint instance of the follower. The OnRemoveFollower( ) method 812 calls the RemoveFollower( ) method 822 on the NavigationController class 750 to remove the UserEndpoint instance from the list of UserEndpoints participating in the co-navigation session.

Alternatively, rather than registering UserEndPoint instances of members who want to follow the navigation of the map and calling the SetPOZ( ) method 880 on the NavigationController 750 on each of the participants' computers, the leader's computer may broadcast messages containing POZ information to members of the shared virtual space regardless of their interest or online/offline status and they can then choose whether or not to follow the perspective of the leader.

Figure 9:
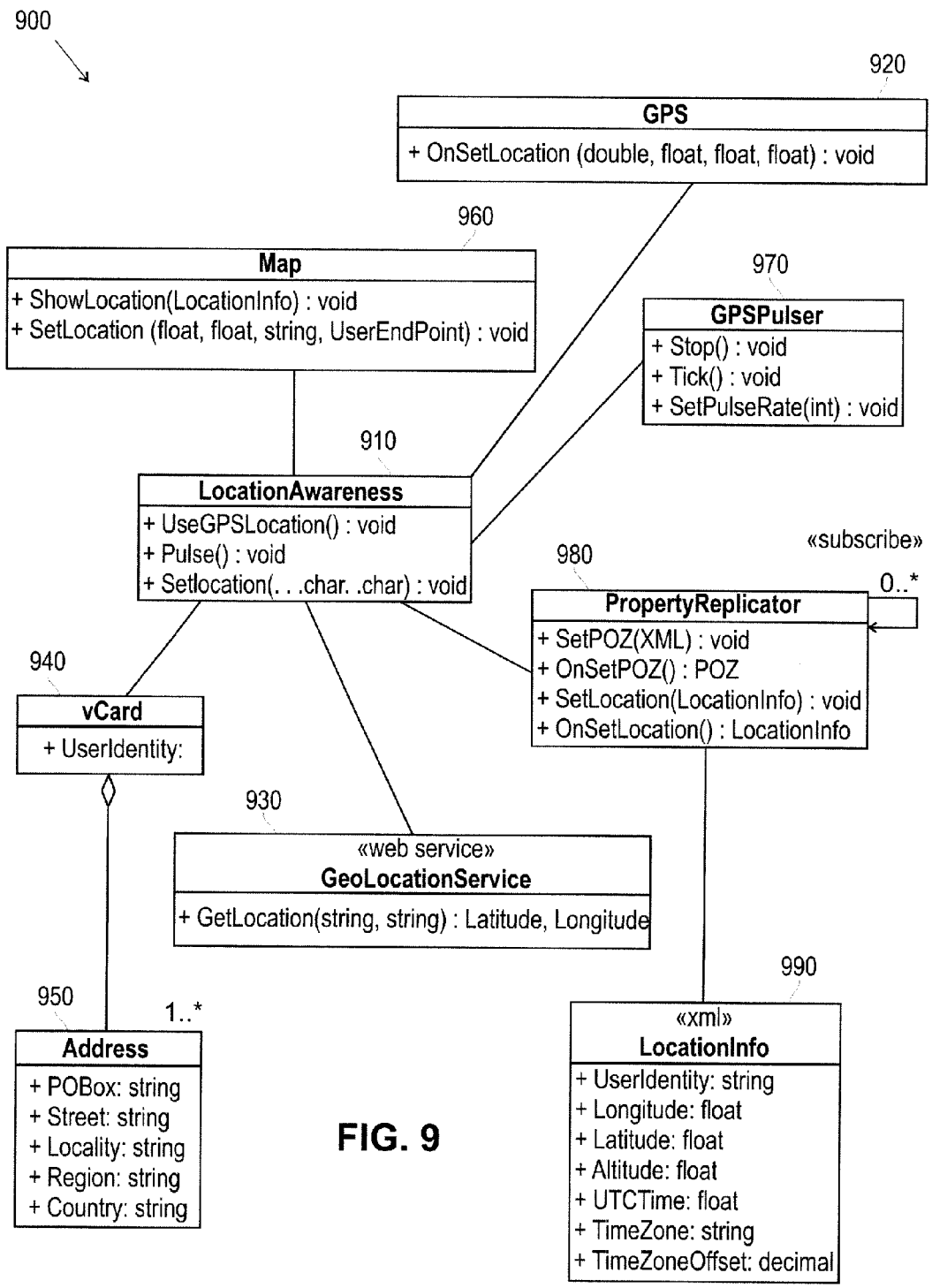
FIG. 9 shows a block diagram of a portion of geo-collaboration software which addresses location awareness on a map shared between two or more computers in accordance with the present invention.

FIG. 9 shows a block diagram 900 of a portion of geo-collaboration software 130 which addresses location awareness as illustrated in FIGS. 3K-3L on a map shared between two or more computers in accordance with the present invention. It should be noted that location awareness of a point of interest on a shared map between two or more computers presumes that the users of the two or more computers share or are members of the same virtual repository.

The block diagram 900 shows software classes 910-990 which, when instantiated, interact with each other to accomplish location awareness on a map shared between two or more computers. The GPSPulser class 970 is responsible for taking messages passed from the LocationAwareness class 910 and determining whether they should be passed out to the PropertyReplicator class 980 based on filter variables including time since the last location was broadcasted, frequency with which the user has chosen to broadcast their location, and whether the longitude, latitude, and altitude have changed. The LocationAwareness class 910 coordinates the other software classes of this portion of the geo-collaboration software 130. The LocationAwareness class 910 is responsible for processing commands directly from a user or indirectly through a map, responding to updates to location and time from a global positioning system (GPS), creating and updating the current users location information data, activating or deactivating GPSPulser class 970, sending location information for a user or device to a PropertyReplicator class 980, asynchronously receiving the location information of other people or devices from the PropertyReplicator class 980, and reading physical address information from a vCard or other repository for physical address information.

The Map class 960 is responsible for rendering the map image to the computer screen and maintaining a view consistent with a current POZ instance. The GPS class 920 is responsible for interfacing with a physical GPS unit connected to the computer. By way of example, the connection can be in the four of a direct serial port connection, a Bluetooth® connection or a universal serial bus (USB) connection. It will be recognized that other suitable connections may be employed. In addition to the roles described above concerning the PropertyReplicator classes 450 and 760, the PropertyReplicator class 980 is responsible for asynchronously propagating location information and POZ information to other members of a collaborative session. The LocationInfo class 990 preferably contains a minimum amount of data to unambiguously identify a position of a person or item and unambiguously identify when the position of a person or item was obtained. Optionally, a LocationInfo instance may provide one or more status values for a person or item. A LocationInfo instance may be encoded in XML or other suitable formats. An exemplary LocationInfo instance may include a user's identity, a longitude reading, a latitude reading, an altitude reading, the time at which the longitude, latitude and altitude readings were made (UTCTime), the name of the time zone in force when making the reading (TimeZone), and the time zone offset which is the difference between the UTCTime and the TimeZone time.

A GeoLocationService service 930 which is external to geo-collaboration software 130 is responsible for reading a physical address such as "15 Main Street, Paduka, Tex., USA" and returning the latitude and longitude readings as well as a description for all address that match a given one.

Figure 10A:
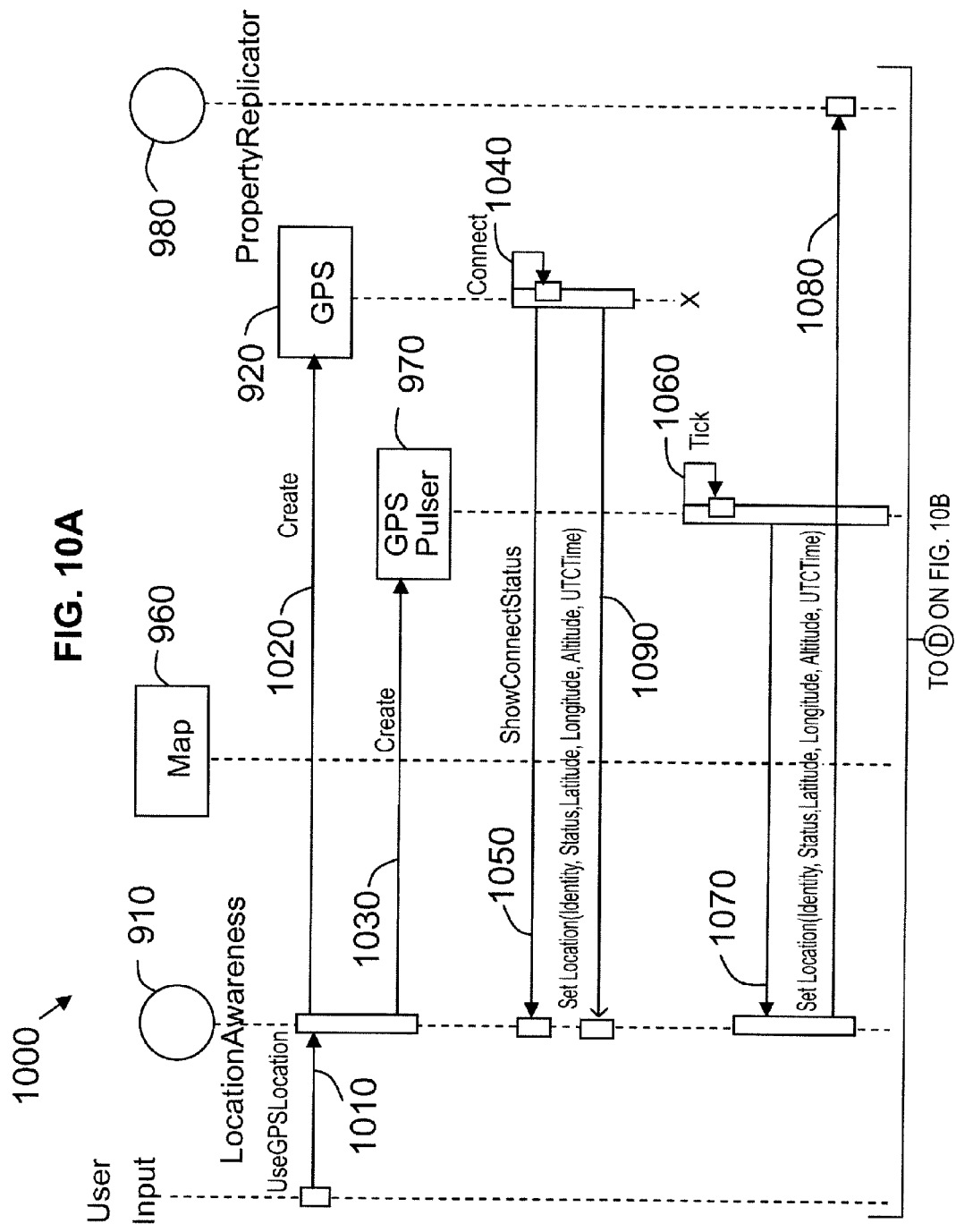
FIG. 10 shows a calling sequence illustrating the interactions of the software class instances of FIG. 9 for sharing a location retrieved from a GPS system of a person or item on a map shared between two or more computers.
Figure 10B:
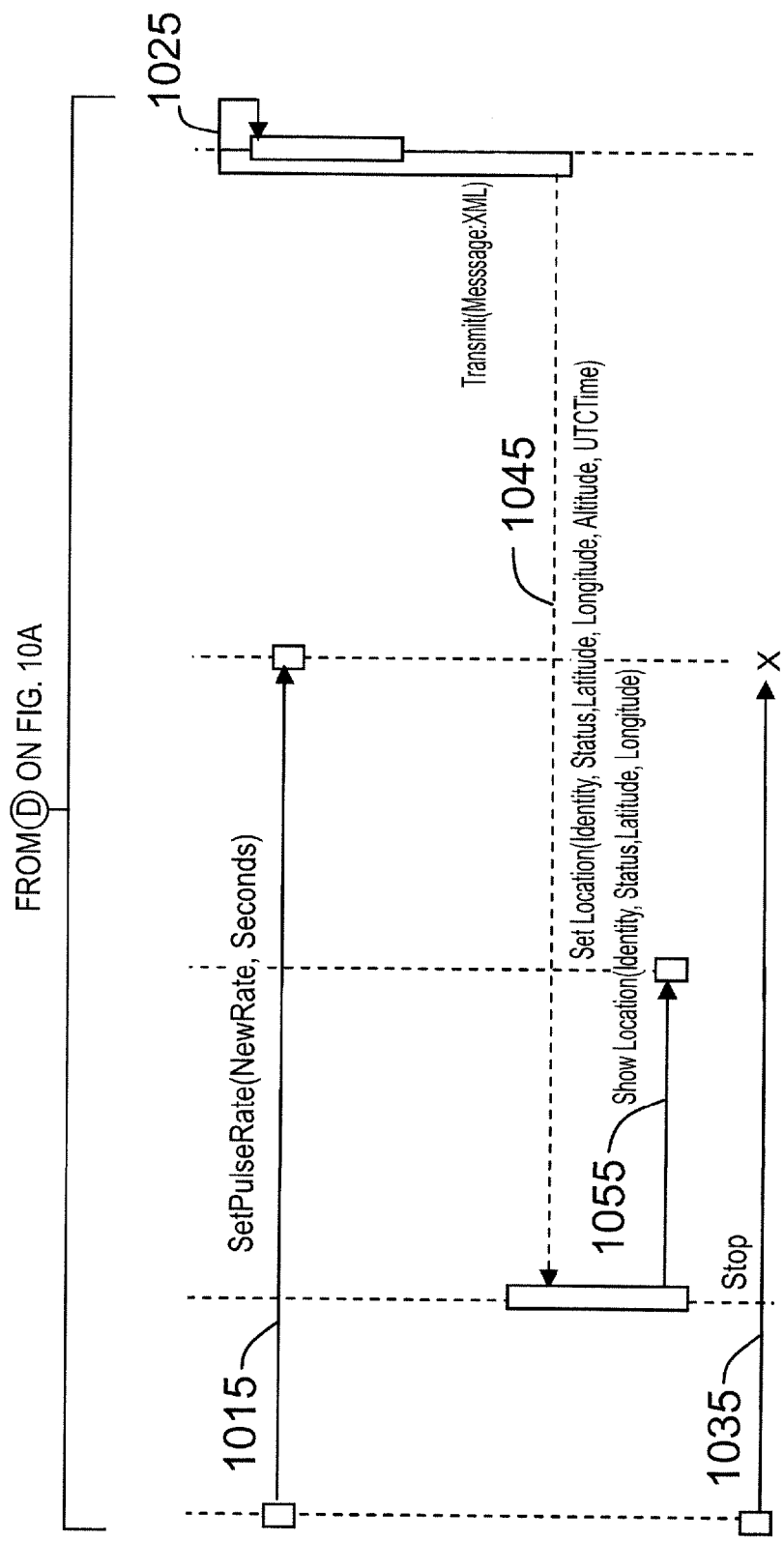

The geo-collaboration software 130 may retrieve location information by various means including a GPS system, using the last clicked entry on a map, or a vCard, for example. FIG. 10 shows a calling sequence illustrating the interactions of the software class instances of FIG. 9 for sharing a location retrieved from a GPS system of a person or item on a map shared between two or more computers. The sequence of calls to methods 1010, 1020, 1030, 1040, and 1050 describe how the geo-collaboration software 130 establishes a session with a GPS system. The GPS session is initiated by a user clicking on the "Connect GPS" link 372 of the Team Location pane 370 resulting in a call to the UseGPSLocation( ) method 1010 on the LocationAwareness class 910. By doing so, the user makes a request for GPS coordinates and expresses the desire to translate these coordinates into location information carried in a POZ instance as described above. The POS instance would then be shared between geo-collaboration software 130 executing on computers by users sharing the same virtual repository.

The UseGPSLocation( ) method 1010 creates an instance of a GPS class 920 to connect to an external GPS system by calling the create( ) method 1020 on the GPS class 920. During the instantiation process, the GPS instance calls the connect( ) method 1040 to cycle through serial posts including virtual serial posts such as USB ports and BlueTooth connections to look for a valid GPS data stream. The ShowConnectStatus( ) method 1050 is called to report the status of the cycled serial posts to the LocationAwareness class. If a valid GPS connection has been made, a GPS session is established between the geo-collaboration software 130 and an external GPS system and that status is also reported.

The external GPS system communicates with the GPS class 920 by sending an encoded stream of text which may suitably include longitude, latitude, altitude, current UTC time or other information. The GPS class 920 filters and parses this stream and passes the resultant data to the Location Awareness class 910 by calling SetLocation( ) method 1090. The SetLocation( ) method 1090 stores information including the user's identity, status, latitude, longitude, altitude, and UTCTime in the LocationAwareness class 910.

The UseGPSLocation( ) method 1010 also creates an instance of a GPS Pulser class 970 by calling Create( ) method 1030 on the GPS Pulser class 970. After a predetermined time period ends which is denoted by Tick( ) method 1060, the GPS Pulser class 970 notifies the Location Awareness class 910 to send the most recent GPS reading through the PropertyReplicator 980. The GPS Pulser class 970 calls the Pulse( ) method 1070 on the LocationAwareness class 910. The Pulse( ) method 1070 then reports the current location information stored in the LocationAwareness class 910 by calling the SetLocation( ) method 1080 on the PropertyReplicator class 980. The predetermined time period may be adjusted by a user to establish how frequently the system is to transmit the user's location. This adjustment can be made by a pick list of values or by entering a numeric value of minutes or seconds. When a user makes such an adjustment, the SetPulseRate( ) method 1015 is called on the GPS Pulser class 970.

The SetLocation( ) method 1080 stores the location information of the user in memory or a persistent data store if the user's computer is temporarily not communicating with network 220. The location information may be stored as XML fragments, a serialized object, a structured query language (SQL) entry, or the like.

The Transmit( ) method 1025 of the PropertyReplicator class 980 runs in its own thread. If the user's computer is communicating with the network 220, the Transmit( ) method 1025 asynchronously sends the location information of the user to all other members sharing the same virtual repository in a scheduled manner. The PropertyReplicator classes on this user's computer and other computers of users utilizing the same virtual repository will receive the location information of this user and will call the SetLocation( ) method 1045 on their respective LocationAwareness classes 910. The SetLocation( ) method 1045 will update the set of tracked locations for team members having supplied location information. SetLocation( ) method 1045 for each of the users utilizing the same virtual repository calls the ShowLocation( ) method 1055 on its respective Map class 960 to show the location information received by its PropertyReplicator class 980. Optionally, the geo-collaboration software 130 may show a 'breadcrumb' trail that shows how the user's location has changed over time.

A user may stop the GPS tracking of himself or herself by clicking on the "Disconnect" link 374 in the Team Location pane 370. When doing so, the Stop( ) method 1035 is called on the GPS Pulser class 970 which ceases notifying the LocationAwareness class 910 of GPS location changes. Consequently, GPS location updates will no longer be rendered to the user's map or the maps viewed by other team members.

Figure 11:
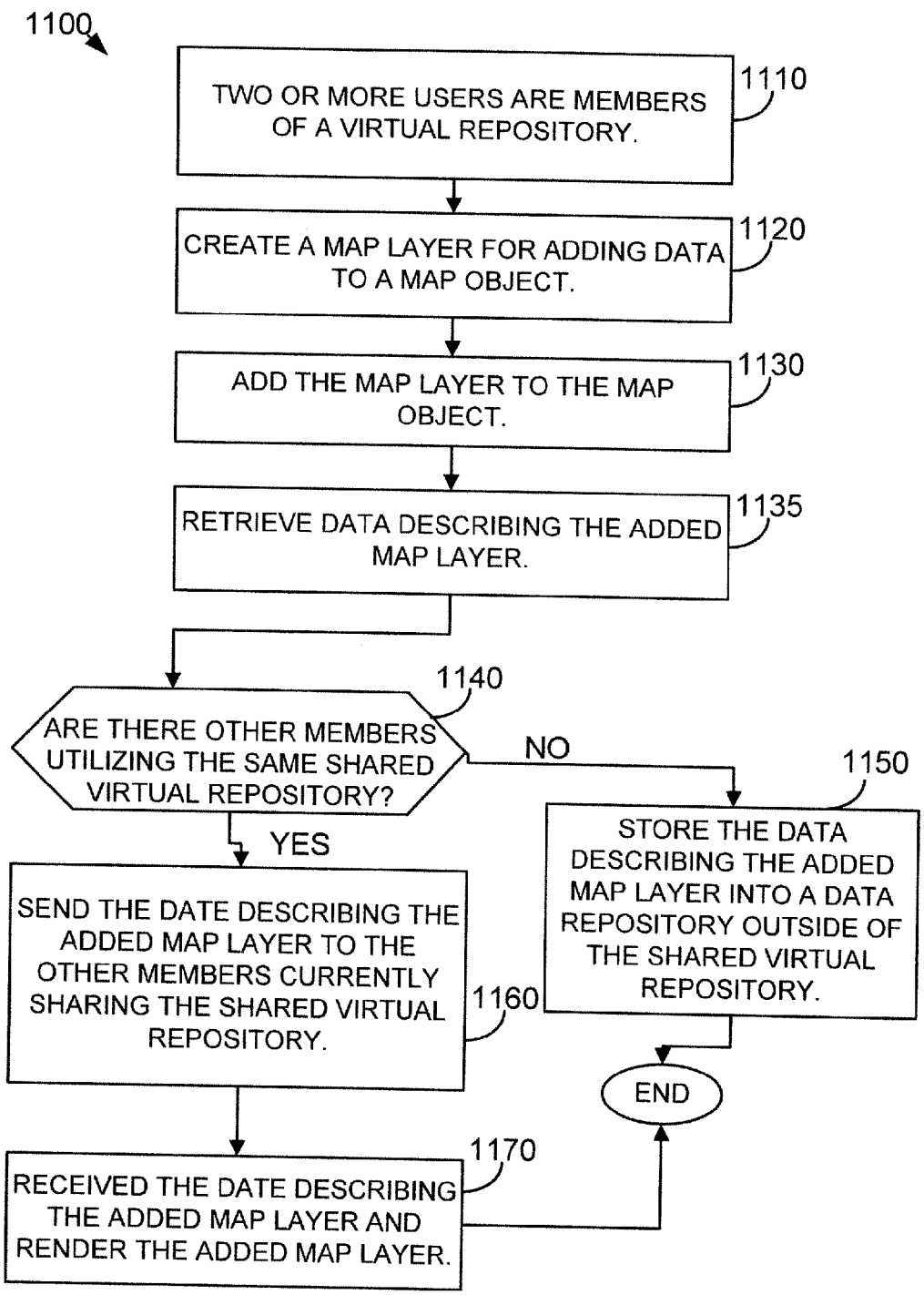
FIG. 11 is a flow chart of a method for synchronizing map layers between two or more computers according to the present invention.

FIG. 11 is a flow chart of a method 1100 for synchronizing map layers between two or more computers according to the present invention. At step 1110, a virtual repository is shared between two or more users. At step 1120, a map layer for adding data to a map object is created. At step 1130, the map layer is added to the map object. At step 1135, data describing the newly added map layer is retrieved.

At step 1140, the method determines whether there are other members utilizing the same shared virtual repository. If there are, the method proceeds to step 1160. At step 1160, data describing the added map layer are sent to the other members currently sharing the shared virtual repository. Optionally at step 1160, if the computer of the user who is adding the new map layer is disconnected from a network, the data describing the added map layer is locally stored until the computer is reconnected to the network. At such time, the data is then sent to the other members of the virtual repository. At step 1170, at the other members' computers, data describing the added map layer is received and used to construct the added map layer. If the computer of the user who is adding the new map layer and one or more of the other members of the virtual repository are connected to the network, the added map layer is then rendered at the other members computers in real time. Otherwise, the added map layer is rendered at the time one or more of the other members connect to the network.

Returning to step 1140, if there are no other members utilizing the same shared virtual repository, method 1100 proceeds to step 1150. At step 1150, the data describing the added map layer is stored into a data repository outside of the shared virtual repository.

Figure 12:
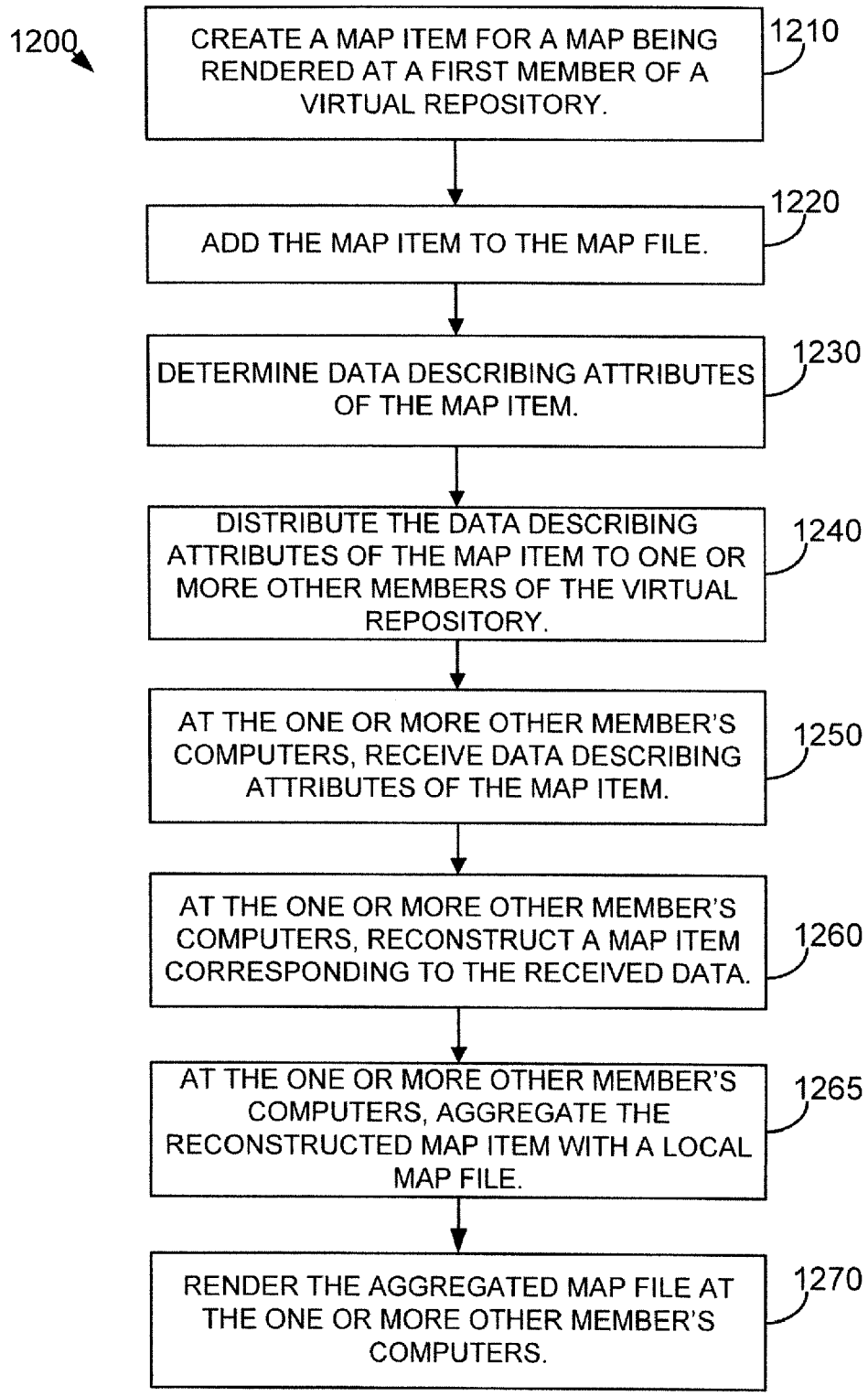
FIG. 12 is a flow chart of a method for sharing a map item between two or more computers according to the present invention.

FIG. 12 is a flow chart of a method 1200 for sharing a map item between two or more computers according to the present invention. At step 1210, a map item for a map being rendered at a first member of a virtual repository is created. For example, a user may use the Add feature of toolbar 320 to add a map item. At step 1220, the map item is added to the map file of the first member. At step 1230, data describing attributes of the map item is determined. For example, attributes may include the font size, font style, the color, and shape of the map item. At step 1240, the data describing attributes of the map item is distributed to one or more other members of the virtual repository. At step 1250, at the one or more other member's computers, data describing attributes of the map item is received. At step 1260, at the one or more other member's computers, a map item corresponding to the received data is reconstructed. At step 1265, at the one or more other member's computers, the reconstructed map item is aggregated with a map file. At step 1270, the aggregated map file including the reconstructed map item is automatically rendered at the one or more other member's computers at substantially the same time as the rendered map item on the first member's computer.

Figure 13:
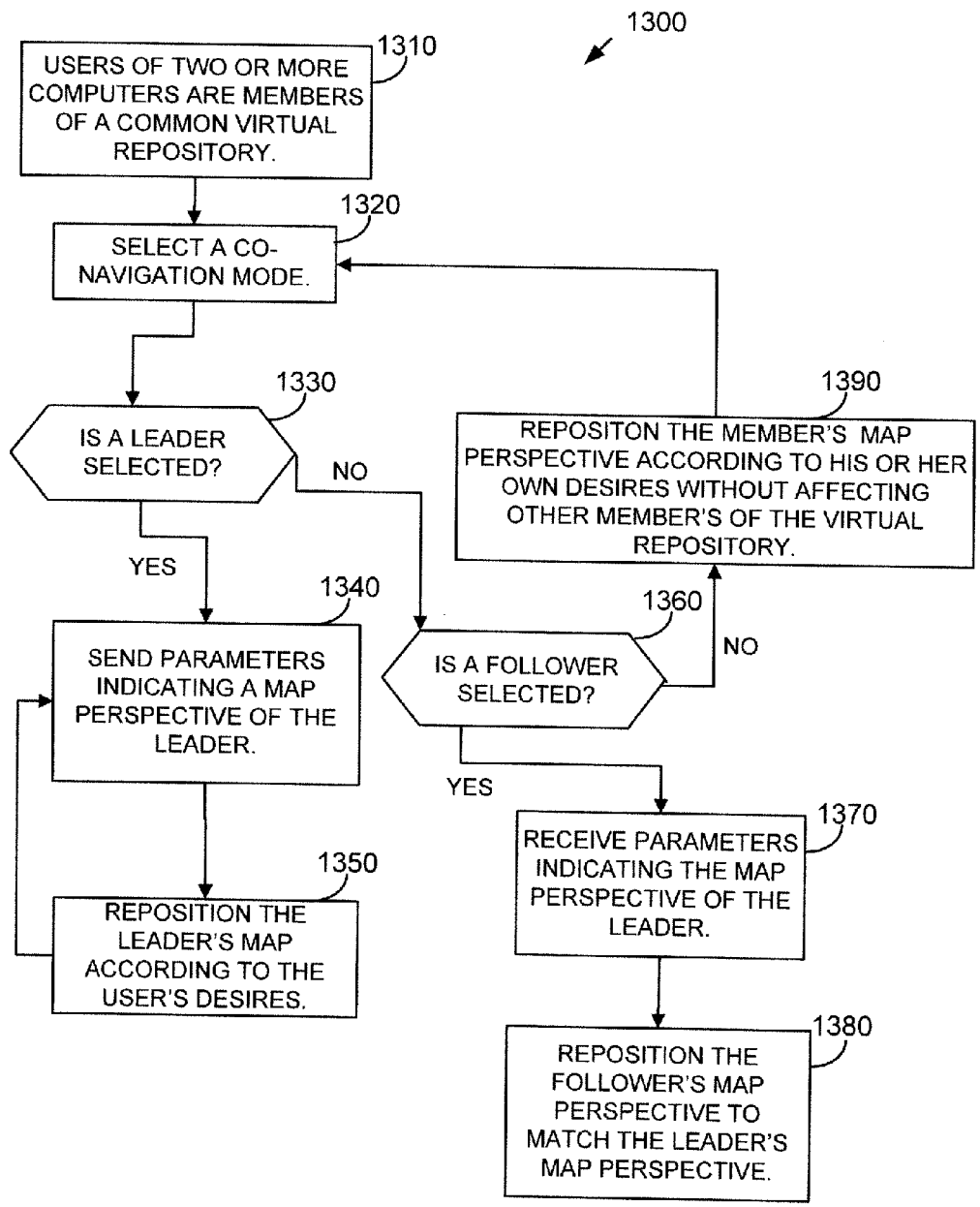
FIG. 13 is a flow chart of a method for co-navigating a map shared by two or more computers according to the present invention.

FIG. 13 is a flow chart of a method 1300 for co-navigating a map between two or more computers according to the present invention. At step 1310, users of two or more computers are members of a common virtual repository. At step 1320, a co-navigation mode is selected by one of the members. At step 1330, the method 1300 determines if a leader co-navigation mode has been selected for the user. If it has, the method 1300 proceeds to step 1340. At step 1340, the parameters indicating the current map perspective being rendered at the leader's computer is sent to other members of the common virtual repository. At step 1350, the leader may reposition his or her rendered map according to the desires of the leader to establish a new map perspective. Once a new map perspective is established, the method proceeds back to step 1340.

Returning to step 1330, if the selected co-navigation mode is not a leader, the method proceeds to step 1360. At step 1360, the method 1300 determines if a follower co-navigation mode has been selected for the user. If it has, the method 1300 proceeds to step 1370. At step 1370, parameters indicating the map perspective of the leader at step 1340 are received at the follower's computer. At step 1380, the follower's map perspective is repositioned and automatically rendered at substantially the same time to match the leaders map perspective.

Returning to step 1360, if the follower co-navigation mode is not selected, the method proceeds to step 1390. At step 1390, the user has chosen not to participate in the co-navigation session and, thus, is in control of its own map perspective without affecting other members of the common virtual repository. Consequently, the follower's map perspective is repositioned outside of a co-navigation session.

Figure 14:
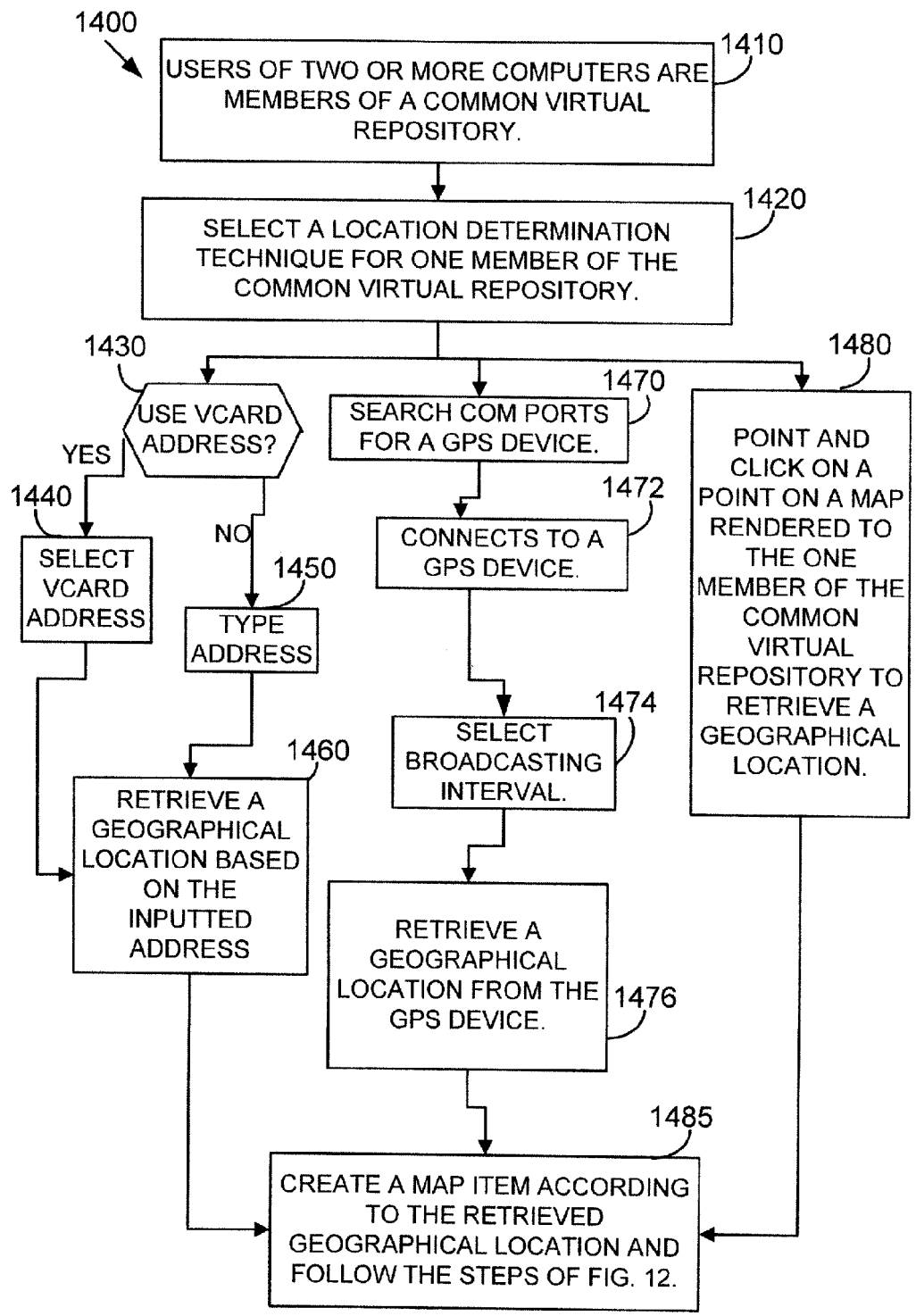
FIG. 14 is a flow chart of a method for plotting and sharing the location of a member between two or more other members of a common virtual repository in accordance with the present invention.

FIG. 14 is a flow chart of a method 1400 for plotting and sharing the location of a member between two or more other members of a common virtual repository in accordance with the present invention. At step 1410, users of two or more computers are members of a common virtual repository. At step 1420, a location determination technique for one member of the common virtual repository is selected. The one member may select either inputting an address as defined in steps 1430, 1440, 1450, and 1460, utilizing a GPS as defined in steps 1470, 1472, 1474, and 1476, or pointing to a geographical location on a map step 1480. See FIG. 3K for the look up address pop-up screen 334.

If an inputting address location technique is selected, the method 1400 proceeds to step 1430. At step 1430, the method 1400 determines if a vCard address is to be used. If it is, method 1400 proceeds to step 1440 where a vCard address is selected as an inputted address. If the vCard address is not to be used, the method 1400 proceeds to step 1450 where the inputted address is typed. A portion of a postal address identifying a location would suffice such as a street intersection of a city, a street address and a city, or the like. Both steps 1440 and 1450 proceed to step 1460 where a geographical location based on the inputted address is retrieved. Step 1460 may be implemented by an external web service, for example. At step 1485, a map item according to the retrieved geographical location is created and shared according to the steps of FIG. 12.

Returning to step 1420, if a GPS technique is selected at step 1420, the method proceeds to step 1470. At step 1470, communication (COM) ports for a GPS device are searched. At step 1472, a GPS device is connected. At optional step 1474, a broadcasting interval is selected to specify how frequently a geographical location is to be retrieved from the GPS device. At step 1476, a geographical location is retrieved from the GPS device. The method 1400 proceeds to step 1485 where a map item according to the retrieved location is created following the steps of FIG. 12.

Returning to step 1420, if a point and click technique is selected, method 1400 proceeds to step 1480. At step 1480, a geographical location is retrieved by the one member of the common virtual repository pointing and clicking on a point on a rendered map. The method 1400 proceeds to step 1485 where a map item according to the retrieved location is created following the steps of FIG. 12.

While the present invention is disclosed in the context of specific exemplary applications of specific exemplary software functions, many variations to these exemplary applications as well as the specific exemplary software functions are contemplated. With regard to other exemplary applications, geo-collaboration software 130 may be utilized by school board members from their respective homes to share an upcoming school redistricting plan, by politicians from their respective locations to share the redrawing of voting districts, by a corporate sales team disbursed across a country to share market penetration information in various regions, and many other examples where geospatial information can be advantageously shared utilizing the present invention.

Further, while the present invention has been disclosed in the context of various aspects of presently preferred embodiments, it will be recognized that the invention may be suitably applied to other environments consistent with the claims which follow.

We claim:

1. A method for a mobile device to receive and display geographical location information associated with a user of a remote device, the method comprising:
  establishing a relationship between a user of the mobile device and the user of the remote device, wherein establishing the relationship between the user of the mobile device and the user of the remote device permits sharing of geographical information associated with the user of the remote device with the user of the mobile device;
  receiving a message via a communication network, the message including position data associated with a current position of the user of the remote device; and
  automatically rendering a graphic on a display of the mobile device based on receiving the message, wherein the graphic is rendered on a map at a location corresponding to the position data associated with the current position of the user of the remote device and the map includes an indication of a current position of the user of the mobile device.

2. The method of claim 1, further comprising:
  receiving recurring update messages, wherein each of the recurring update messages includes updated position data associated with an updated position of the user of the remote device; and
  automatically rendering the graphic on the map at a location corresponding to the updated position of the user of the remote device based on receiving the recurring update messages.

3. The method of claim 1, wherein the position data comprises latitude information, longitude information, and a time associated with the latitude information and the longitude information.

4. The method of claim 1, wherein establishing the relationship between the user of the mobile device and the user of the remote device further permits sharing of geographical information associated with the user of the mobile device with the user of the remote device.

5. The method of claim 1, wherein the location of the user of the mobile device is determined using a global positioning system (GPS) device.

6. A tangible computer readable storage medium including computer readable instructions that when executed on a processor perform a method comprising:
  establishing a relationship between a user of a first device and a user of a second device, wherein establishing the relationship between the user of the first device and the user of the second device permits sharing of geographical information associated with the user of the second device with the user of the first device;

receiving a message via a communication network, the message including position data associated with a current position of the user of the second device; and automatically rendering a graphic on a display of the first device based on receiving the message, wherein the graphic is rendered on a map at a location corresponding to the position data associated with the current position of the user of the remote device and the map includes an indication of a current position of the user of the first device.

7. The tangible computer readable storage medium of claim 6, wherein the method further comprises:

receiving recurring update messages, wherein each of the recurring update messages includes updated position data associated with an updated position of the user of the second device; and automatically rendering the graphic on the map at a location corresponding to the updated position of the user of the second device based on receiving the recurring update messages.

8. The tangible computer readable storage medium of claim 6, wherein the position data comprises latitude information, longitude information, and a time associated with the latitude information and the longitude information.

9. The tangible computer readable storage medium of claim 6, wherein establishing the relationship between the user of the first device and the user of the second device further permits sharing of geographical information associated with the user of the first device with the user of the second device.

10. The tangible computer readable storage medium of claim 6, wherein the location of the user of the first device is determined using a global positioning system (GPS) device.

11. The method of claim 1, further comprising:

receiving a second message via the communication network, the second message including position data associated with a current position of a user of a second remote device; and automatically rendering a second graphic on the display of the mobile device based on receiving the second message, wherein the second graphic is rendered on the map at a location corresponding to the position data associated with the current position of the user of the second remote device.

12. The method of claim 1, wherein the position data comprises an identity of the user of the remote device and the position data is encoded using extensible markup language (XML).

13. The computer readable storage medium of claim 6, wherein the method further comprises:

receiving a second message via the communication network, the second message including position data associated with a current position of a user of a third device; and automatically rendering a second graphic on the display of the mobile device based on receiving the second message, wherein the second graphic is rendered on the map at a location corresponding to the position data associated with the current position of the user of the second remote device.

14. The tangible computer readable storage medium of claim 6, wherein the indication of the current position of the user of the first device comprises a second graphic that is rendered on the map at a location corresponding to the current position of the user of the first device.

15. A mobile device comprising:

a processor configured to establish a relationship between a user of the mobile device and a user of a remote device, wherein establishing the relationship between the user of the mobile device and the user of the remote device permits sharing of geographical information associated with the user of the remote device with the user of the mobile device;

an interface operably connected to a communication network, the interface configured to receive a message, wherein the message includes position data associated with a current position of the user of the remote device; and the processor further configured to automatically render a graphic on a display of the mobile device based on receiving the message, wherein the graphic is rendered on a map at a location corresponding to the position data associated with the current position of the user of the remote device and the map includes an indication of a current position of the user of the mobile device.

16. The mobile device of claim 15, wherein the interface is further configured to receive recurring update messages, each of the recurring update messages including updated position data associated with an updated position of the user of the remote device, and the processor is further configured to automatically render the graphic on the map at a location corresponding to the updated position of the user of the remote device based on receiving the recurring update messages.

17. The mobile device of claim 15, wherein the position data comprises latitude information, longitude information, and a time associated with the latitude information and the longitude information.

18. The mobile device of claim 15, wherein establishing the relationship between the user of the mobile device and the user of the remote device further permits sharing of geographical information associated with the user of the mobile device with the user of the remote device.

19. The mobile device of claim 15, wherein the location of the user of the mobile device is determined using a global positioning system (GPS) device.

20. The mobile device of claim 15, wherein the interface is further configured to receive a second message, the second message including position data associated with a current position of a user of a second remote device, and the processor is further configured to automatically render a second graphic on the display of the mobile device based on receiving the second message, the second graphic being rendered on the map at a location corresponding to the position data associated with the current position of the user of the second remote device.

* * * * *